(12) United States Patent
Jain et al.

(10) Patent No.: US 9,407,767 B2
(45) Date of Patent: Aug. 2, 2016

(54) SYSTEMS AND METHODS FOR TRACKING CALLS RESPONSIVE TO ADVERTISEMENTS USING BACK CHANNEL MESSAGING AND DATA CHANNEL COMMUNICATIONS

(71) Applicant: YP LLC, Tucker, GA (US)

(72) Inventors: Mehul Jain, Foster City, CA (US); Kent William Laux, Fremont, CA (US); Deepak Kumar Thakral, Burbank, CA (US)

(73) Assignee: YP LLC, Tucker, GA (US)

( * ) Notice: Subject to any disclaimer, the term of this patent is extended or adjusted under 35 U.S.C. 154(b) by 0 days.

(21) Appl. No.: 14/448,897

(22) Filed: Jul. 31, 2014

(65) Prior Publication Data

US 2015/0036817 A1    Feb. 5, 2015

Related U.S. Application Data

(60) Provisional application No. 61/860,879, filed on Jul. 31, 2013, provisional application No. 61/860,881, filed on Jul. 31, 2013.

(51) Int. Cl.
| | |
|---|---|
| *H04M 3/00* | (2006.01) |
| *H04M 3/51* | (2006.01) |
| *H04M 3/523* | (2006.01) |
| *G06Q 30/02* | (2012.01) |

(52) U.S. Cl.
CPC ......... *H04M 3/5175* (2013.01); *G06Q 30/0257* (2013.01); *H04M 3/5191* (2013.01); *H04M 3/5235* (2013.01)

(58) Field of Classification Search
CPC ............ H04M 3/5191; H04M 3/5183; H04M 3/5166; H04M 3/5233; H04M 15/00; H04M 15/58

USPC ................................ 379/265.09, 266.02, 133
See application file for complete search history.

(56) References Cited

U.S. PATENT DOCUMENTS

| | | | |
|---|---|---|---|
| 5,930,474 A | 7/1999 | Dunworth et al. | |
| 7,668,832 B2 | 2/2010 | Yeh | |
| 7,689,466 B1 | 3/2010 | Benbrahim et al. | |
| 7,774,348 B2 | 8/2010 | Delli Santi et al. | |
| 7,801,897 B2 | 9/2010 | Egnor | |
| 8,239,273 B1 | 8/2012 | Marshall et al. | |

(Continued)

OTHER PUBLICATIONS

Berry, "Data Mining Techniques: For Marketing, Sales and Customer Relationships," 2004.

(Continued)

*Primary Examiner* — Rasha Al Aubaidi
(74) *Attorney, Agent, or Firm* — Alston & Bird LLP

(57) ABSTRACT

Systems, methods, apparatus, and computer-readable media are provided to track call information pertinent to calls responsive to advertisements. A message may be received via a data network from a communication device running an application. The application may be associated with a communication reference. Responsive to selection of a user-selectable option that may correspond to an advertisement presented via the communication device, the message may be sent, via the data network, to a call information handling system. The message may indicate call information. Unique identification of the communication device and/or a user may be determined. The call information may be stored in a tracking information repository in association with the unique identification.

20 Claims, 15 Drawing Sheets

(56) References Cited

U.S. PATENT DOCUMENTS

| | | | |
|---|---|---|---|
| 8,370,197 | B2 | 2/2013 | Axe et al. |
| 8,577,016 | B1 | 11/2013 | Duva et al. |
| 8,781,105 | B1 * | 7/2014 | Duva et al. ............... 379/265.09 |
| 2002/0049635 | A1 | 4/2002 | Mai et al. |
| 2002/0123984 | A1 | 9/2002 | Prakash |
| 2004/0073693 | A1 | 4/2004 | Slater et al. |
| 2005/0055337 | A1 | 3/2005 | Bebo et al. |
| 2006/0149774 | A1 | 7/2006 | Egnor |
| 2006/0242017 | A1 | 10/2006 | Libes et al. |
| 2007/0100834 | A1 | 5/2007 | Landry et al. |
| 2007/0161382 | A1 | 7/2007 | Melinger et al. |
| 2007/0162334 | A1 | 7/2007 | Altberg et al. |
| 2007/0233577 | A1 | 10/2007 | Glass |
| 2007/0288437 | A1 | 12/2007 | Xia |
| 2008/0059298 | A1 | 3/2008 | Waag et al. |
| 2008/0270164 | A1 | 10/2008 | Kidder et al. |
| 2009/0144068 | A1 | 6/2009 | Altberg et al. |
| 2009/0187459 | A1 | 7/2009 | Hayes, Jr. et al. |
| 2009/0247193 | A1 | 10/2009 | Kalavade |
| 2009/0299831 | A1 | 12/2009 | Li et al. |
| 2010/0093441 | A1 | 4/2010 | Rajaraman et al. |
| 2011/0213741 | A1 | 9/2011 | Shama et al. |
| 2011/0275047 | A1 | 11/2011 | Gomes et al. |
| 2011/0295628 | A1 | 12/2011 | Priyadarshan et al. |
| 2012/0078742 | A1 | 3/2012 | Oleen |
| 2012/0078938 | A1 | 3/2012 | Davis et al. |
| 2012/0116872 | A1 | 5/2012 | Hicken et al. |
| 2012/0179568 | A1 | 7/2012 | Soroca et al. |
| 2013/0124259 | A1 | 5/2013 | Chourey et al. |
| 2013/0129060 | A1 * | 5/2013 | Gopalakrishnan et al. ........................ 379/93.01 |
| 2013/0254035 | A1 | 9/2013 | Ramer et al. |
| 2013/0297442 | A1 | 11/2013 | Simons et al. |
| 2014/0012678 | A1 | 1/2014 | Hayes, Jr. |
| 2014/0222551 | A1 * | 8/2014 | Jain et al. ................... 705/14.42 |

OTHER PUBLICATIONS

Office Action mailed May 13, 2015 in U.S. Appl. No. 12/940,976, 14 pages.

Office Action mailed Jul. 28, 2015 in U.S. Appl. No. 13/965,123, 29 pages.

Office Action mailed Mar. 12, 2015 in U.S. Appl. No. 12/965,741, 15 pages.

Office Action mailed Aug. 13, 2013 in U.S. Appl. No. 12/965,741, 13 pages.

Office Action mailed Feb. 28, 2013 in U.S. Appl. No. 12/965,741, 12 pages.

Office Action mailed Apr. 7, 2015 in U.S. Appl. No. 12/965,773, 13 pages.

Office Action mailed Aug. 14, 2013 in U.S. Appl. No. 12/965,773, 14 pages.

Office Action mailed Jan. 25, 2013 in U.S. Appl. No. 12/965,773, 11 pages.

Office Action mailed Aug. 21, 2015 in U.S. Appl. No. 12/952,975, 11 pages.

* cited by examiner

SYSTEMS AND METHODS FOR TRACKING CALLS RESPONSIVE TO ADVERTISEMENTS USING BACK CHANNEL MESSAGING AND DATA CHANNEL COMMUNICATIONS

CROSS-REFERENCES TO RELATED APPLICATIONS

This application claims the benefit of U.S. Provisional Patent Application No. 61/860,879 filed Jul. 31, 2013, entitled "SYSTEMS AND METHODS FOR TRACKING CALLS RESPONSIVE TO ADVERTISEMENTS USING DATA CHANNEL COMMUNICATIONS," and U.S. Provisional Patent Application No. 61/860,881 filed Jul. 31, 2013, entitled "SYSTEMS AND METHODS FOR TRACKING CALLS RESPONSIVE TO ADVERTISEMENTS USING BACK CHANNEL MESSAGING," the entire disclosures of which are hereby incorporated by reference for all purposes.

Further, the present application is related to commonly-owned U.S. patent application Ser. No. 13/965,123 filed Aug. 12, 2013, entitled "SALES LEAD QUALIFICATION OF A CONSUMER BASED ON SALES LEAD RULES," and U.S. patent application Ser. No. 14/173,573 filed Feb. 5, 2014, entitled "ADVERTISING TRACKING AND ALERT SYSTEMS," the entire disclosures of which are hereby incorporated by reference for all purposes.

BACKGROUND OF THE DISCLOSURE

The present disclosure relates in general to telephonic connections, and, more specifically, but not by way of limitation, to systems, methods, apparatus, and computer-readable media for tracking calls responsive to advertisements using back channel messaging and data channel communications.

As value, use, access, and demand corresponding to advertising continue to increase, tracking consumer responses to advertising becomes more problematic. In the past, tracking calls placed pursuant to advertisements has entailed assigning a telephone number to a service provider and using that telephone number as a call tracking number. A call placed to the call tracking number through the public switched telephone network (PSTN) would be routed to the service provider to which the number was assigned. Such a method requires separate call tracking numbers for assigning to service providers, and the telephone number inventory is limited.

Thus, there is a need for alternative solutions whereby separate telephone numbers are not needed for call tracking. Moreover, alternative solutions are needed so that call tracking is not limited by a telephone number inventory.

BRIEF SUMMARY OF THE INVENTION

Certain embodiments according to the present disclosure relate in general to telephonic connections, and more specifically, but not by way of limitation, to systems, methods, apparatus, and computer-readable media for tracking calls responsive to advertisements using back channel messaging and data channel communications.

In one aspect, a method is provided to track call information pertinent to one or more calls responsive to one or more advertisements presented to a user of a communication device where a call information handling system utilizes communications via a data network to facilitate the tracking of call information. The method may include any one or combination of the following, which may be performed by a call information handling system. A message may be received via a data network from a communication device running an application. The communication device may be configured with the application is configured to perform any one or combination of the following. The application may be associated with a communication reference of the communication device. A selection of a user-selectable option presented via the communication device may be detected. Responsive to the selection of the user-selectable option, the message may be sent, via the data network, to the call information handling system. The selection may correspond to an advertisement presented via the communication device. The message may indicate call information corresponding to one or more of: the communication reference; the advertisement; the communication device; and/or a callee communication reference. The message may be processed and the call information may be identified. Unique identification of the communication device and/or a user of the communication device may be determined. The call information may be stored in a tracking information repository in association with the unique identification.

In another aspect, a system is provided to track call information pertinent to one or more calls responsive to one or more advertisements presented to a user of a communication device utilizing communications via a data network to facilitate the tracking of call information. The system may include any one or combination of the following. One or more network interfaces may be configured to receive communications via a data network from a communication device running an application. The communication device configured with the application may be configured to perform include any one or combination of the following. The application may be associated with a communication reference of the communication device. A selection of a user-selectable option presented via the communication device may be detected. Responsive to the selection of the user-selectable option, the message may be sent, via the data network, to the call information handling system. The selection may correspond to an advertisement presented via the communication device. The message may indicate call information corresponding to one or more of: the communication reference; the advertisement; the communication device; and/or a callee communication reference. A tracking information repository may retain information relating to calls. One or more processing devices may be coupled to the one or more network interfaces and the tracking information repository. The one or more processing devices may be configured to perform one or a combination of the following. The message processed and the call information may be identified. Unique identification of the communication device and/or a user of the communication device may be determined. The call information may be stored in the tracking information repository in association with the unique identification.

In yet another aspect, one or more non-transitory, machine-readable media are provided having machine-readable instructions thereon which, when executed by one or more computers or other processing devices, cause the one or more computers or other processing devices to perform one or a combination of the following. A message may be received via a data network from a communication device running an application. The communication device configured with the application may be configured to perform one or a combination of the following. The application may be associated with a communication reference of the communication device. A selection of a user-selectable option presented via the communication device may be detected. Responsive to the selection of the user-selectable option, the message may be sent, via the data network, to the one or more computers or other processing devices. The selection may correspond to an advertisement presented via the communication device. The message may indicate call information corresponding to one or more of: the communication reference; the advertisement; the communication device; and/or a callee communication reference. The message processed and the call information may be identified. Unique identification of the communication device and/or a user of the communication device may be determined. The call information may be stored in a tracking information repository in association with the unique identification.

In various embodiments, an advertiser corresponding to the advertisement may be identified, and indication, via an advertiser interface of the call information handling system, of one or more items of the call information may be caused. In various embodiments, the communication reference of the communication device may include a telephone number and/or a subscriber identification. In various embodiments, the communication device configured with the application may be further configured to present the advertisement via the application. In various embodiments, the communication device configured with the application may be further configured to capture information about the advertisement, where the advertisement is presented via another application of the communication device.

In various embodiments, the user-selectable option may include a click-to-call option corresponding to the advertisement. In various embodiments, the user-selectable option may include a call button, where the communication device configured with the application may be further configured to determine an association of the selection of the user-selectable option with the advertisement.

In various embodiments, a communication session may be initiated, via the data network, with a callee communication device based at least in part on the callee communication reference. In various embodiments, the message does not comprise the callee communication reference, and the call information handling system may determine the callee communication reference based at least in part on the call information. In various embodiments, the communication session may be coordinated to facilitate voice communication between the callee communication device and the communication device via the data network.

In various embodiments, the selection further may correspond to an initiation of a first communication session from the communication device. A second communication session may be initiated, via the data network, with a callee communication device based at least in part on the callee communication reference. The first communication session and the second communication session may be coordinated to facilitate voice communication between the callee communication device and the communication device via the data network. In various embodiments, the callee communication device and the communication device may not be mutually connected until the callee communication device is answered.

In various embodiments, a communication session may be initiated, via the data network, with a callee communication device. A communication session may be initiated, via the data network, with the communication device. Voice communication may be facilitated, via the data network, between the callee communication device and the communication device.

In various embodiments, a plurality of communication sessions may be initiated, via the data network, with a plurality of callee communication devices based at least in part on the callee communication reference. The plurality of communication sessions may be coordinated to facilitate voice communication, via the data network, between a selected one of the plurality of callee communication devices and the communication device.

In various embodiments, one or more characteristics of a data connection available to the communication device may be determined. It may be determined whether the one or more characteristics of the data connection satisify a set of criteria. Contingent on determining that the one or more characteristics of the data connection satisify the set of criteria, the communication session over the data network with a callee communication device may be initiated based at least in part on the callee communication reference. Contingent on determining that the one or more characteristics of the data connection do not satisify the set of criteria, a call from the communication device may be allowed to proceed with a telephony network.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
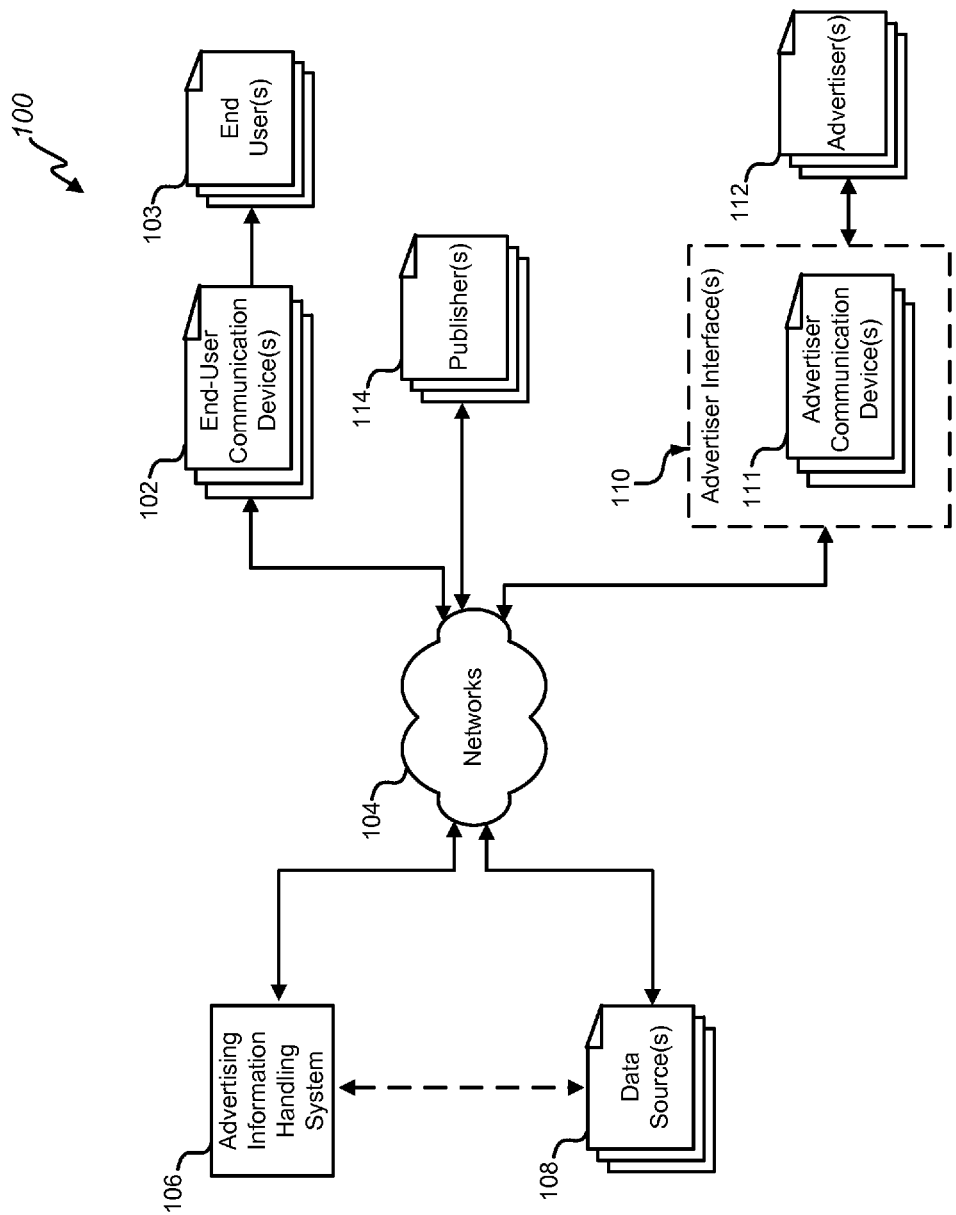
FIG. 1 depicts a high-level block diagram of a system, in accordance with certain embodiments of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments may be practiced without these specific details. For example without limitation, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Various embodiments will now be discussed in greater detail with reference to the accompanying figures, beginning with FIG. 1.

FIG. 1 depicts a high-level block diagram of a system 100, in accordance with certain embodiments of the present disclosure. The system 100 allows for interaction between two or more of communication device(s) 102, end user(s) 103, an advertising information handling system 106, data source(s) 108, advertiser(s) 112, advertiser 112 portal interface(s) 110, advertiser 112 communication device(s) 111, and/or publisher(s) 114. As depicted, various elements of the system 100 may be communicatively coupled or couplable to one or more networks 104.

The one or more networks 104 may be any suitable means to facilitate data transfer in the system 100. In various embodiments, the one or more networks 104 may be implemented with, without limitation, one or more of the Internet, a wide area network (WAN), a local area network (LAN), a wireless local area network (WLAN), a metropolitan area network (MAN), a cellular network, such as through 4G, 3G, GSM (Global System for Mobile Communications), CDMA (code division multiple access), etc., another wireless network, a gateway, a public switched telephone network (PSTN), or any other appropriate architecture or system that facilitates the communication of signals, data, and/or messages. In various embodiments, the one or more networks 104 may transmit data using any suitable communication protocol(s). In various embodiments, the one or more networks 104 and the various components thereof may be implemented using hardware, software, and communications media such wires, optical fibers, microwaves, radio waves, and other electromagnetic and/or optical carriers; and/or any combination of the foregoing and/or the like. The end-user communication device(s) 102, end user(s) 103, advertiser(s) 112, publisher(s) 114, advertising information handling system 106, and/or data source(s) 108 may be communicatively coupled or couplable to the one or more networks 104 via any suitable communication paths that support the communication protocol(s) used in the various embodiments.

The advertising information handling system 106 may facilitate searching of one or more information repositories in response to information received over the one or more networks 104 from the end-user communication devices 102. In various embodiments, the advertising information handling system 106 may include any device or set of devices configured to process, send, receive, retrieve, detect, generate, compute, organize, categorize, qualify, store, display, present, handle, or use any form of information or data suitable for the embodiments described herein.

The advertising information handling system 106 may include a single computing device or multiple computing devices, which may be implemented in or with a distributed computing and/or cloud computing environment. The advertising information handling system 106 may include one or more processing resources communicatively coupled to one or more storage media, random access memory (RAM), read-only memory (ROM), and/or other types of memory. The advertising information handling system 106 may include any one or combination of various input and output (I/O) devices, network ports, and display devices.

In certain embodiments, the advertising information handling system 106 may be communicatively coupled or couplable to one or more data sources 108. The one or more data sources 108 may include any suitable source of data. In various embodiments, the one or more data sources 108 may include one or more of a database, a website, any repository of data in any suitable form, and/or a third party. With some embodiments, the data sources 108 may include one or more mobile computing device locator services that provide information regarding the location of one or more end-user communication devices 102. With some embodiments, the data sources 108 may provide various details relating to call data. With some embodiments, the data sources 108 may provide caller name information from calling name delivery (CNAM), also known as caller identification or caller ID, may be used to determine particular details about the caller. With some embodiments, the data sources 108 may provide information about the area of a caller. With some embodiments, the data sources 108 may provide demographic data about an area.

In various embodiments, the data from the one or more data sources 108 may be retrieved and/or received by the advertising information handling system 106 via the network 104 and/or through any other suitable means of transferring data. For example, in some embodiments, the advertising information handling system 106 and the data sources 108 could use any suitable means for direct communication, as depicted. According to certain embodiments, data may be actively gathered and/or pulled from one or more data sources 108, for example, by accessing a third party repository and/or by "crawling" various repositories. The data pulled and/or pushed from the one or more data sources 108 may be made available by the advertising information handling system 106 for user(s) 103 of the end-user communication devices 102. In alternative embodiments, data from the one or more data sources 108 may be made available directly to the end-user communication devices 102.

According to certain embodiments, the advertising information handling system 106 may be or include an advertising platform. The advertiser(s) 112 may access the advertising information handling system 106 via advertiser interface(s) 110. In various embodiments, the advertiser interface(s) 110 may include any suitable input/output module or other system/device operable to serve as an interface between the advertiser(s) 112 and the advertising platform. In some embodiments, an advertiser interface 110 may include an application programming interface (API). In some embodiments, an advertiser interface 110 may include a web interface. The advertiser interface 110 may cause a web page to be displayed on a browser of an advertiser 112. The advertiser interface 110 may allow for transfer of and access to advertising information in accordance with certain embodiments disclosed herein. Accordingly, the advertising information handling system 106 may have web site/portals giving access to such information. The advertiser interface(s) 110 may facilitate communication over the one or more networks 104 using any suitable transmission protocol and/or standard. In some embodiments, the advertising information handling system 106 may include and/or provide the advertiser interface(s) 110, for example, by making available one or more of a website, a web page, a web portal, a web application, a mobile application, enterprise software, and/or any suitable application software.

In certain embodiments, an advertiser interface 110 may include one or more advertiser communication devices 111. In certain embodiments, the one or more advertiser communication devices 111 may include a mobile computing device that may be any portable device suitable for sending and receiving information over a network in accordance with embodiments described herein. For example without limitation, in various embodiments, the advertiser communication devices 111 may include one or more devices variously referenced as a mobile phone, a cellular telephone, a smartphone, a handheld mobile device, a tablet computer, a web pad, a personal digital assistant (PDA), a notebook computer, a handheld computer, a laptop computer, and/or the like.

In some embodiments, the advertising information handling system 106 may provide for the selection and provision of advertisements to one or more of end-user computing devices 102, end users 103, and/or publishers 112. In certain embodiments, one or more advertisers 110 may have advertisements that may be placed in a web page made available to one or more computing devices 102. In certain embodiments, one or more advertisers 110 may have advertisements that may be displayed with an application made available to one or more computing devices 102, such as a mobile application. The placement of the advertisements may be in accordance with one or more paid placement arrangements and one or more advertising models.

Advertisements may be included in a results page responsive to a keyword search initiated by an end user 103. The search may be performed by an online search engine facilitated by the advertising information handling system 106. An advertisement of an advertiser 112 may be included within a results page with results identified and/or compiled by the search engine and sent via the one or more networks 104 to the end-user communication device 102 of the end user 103 that initiated the search. The inclusion and/or placed of the advertisement may be based on a paid placement model and/or paid inclusion model.

Advertisements may be provided for a publisher's website or other media channel. The publishers 114 may use, facilitate, and/or provide any of various types of media channels. For example, the media channels may correspond to one or more of web, mobile, social, video, television, and/or the like.

In some embodiments, the publishers 114 may access the advertising information handling system 106 via an application programming interface (API). In some embodiments, the publishers 114 may request one or more advertisements from the advertising information handling system 106. In some embodiments, the requests may correspond to a search query from an end user 103.

In some embodiments, advertisers 112 and end-user communication devices 102 may communicate via Voice Over Internet Protocol (VoIP) technology. An end user 103 and an advertiser 112 may be communicatively coupled through switches of the one or more networks 104, which may include switches of a public telephone network in some embodiments. In some embodiments, one or more advertisers 112 could be notified via various media channels, such as email, chat, instant message, etc.

Figure 2:
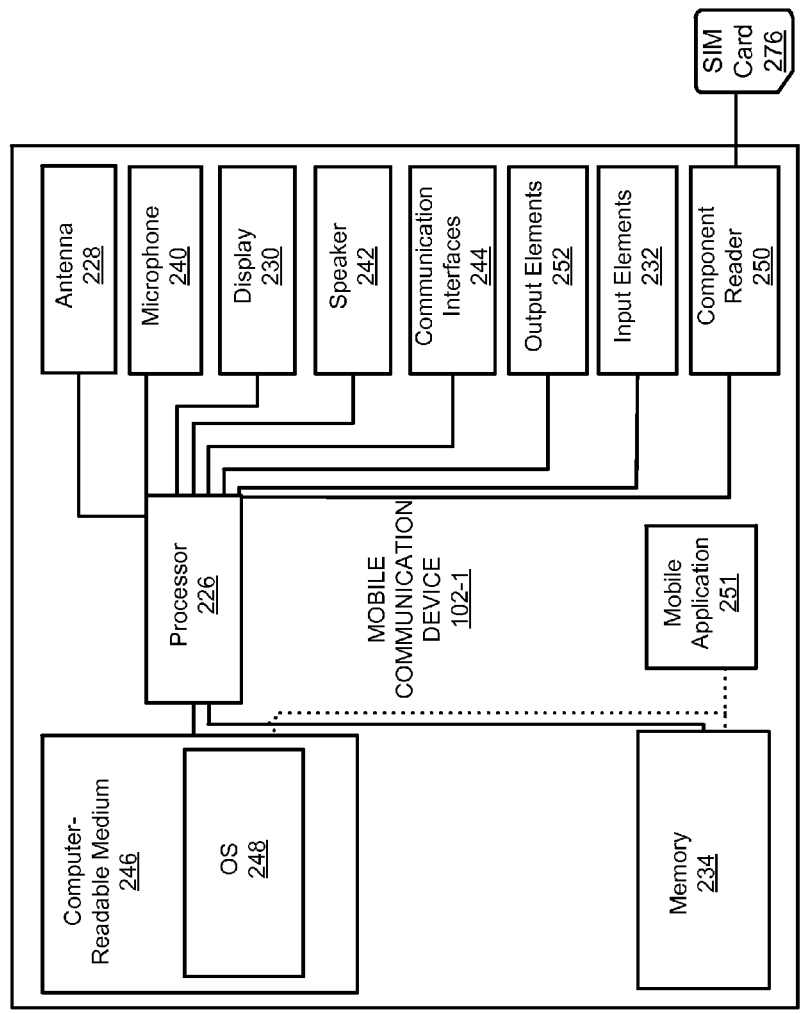
FIG. 2 depicts a functional block diagram of a mobile communication device, in accordance with certain embodiments of the present disclosure.

FIG. 2 is a functional block diagram of an end-user computing device 102-1 and/or advertiser communication device 111-1, each of which may be a mobile communication device 102-1, in accordance with certain embodiments of the present disclosure. For the sake of simplicity, only the mobile communication device 102-1 is referenced with respect to FIG. 2, though the discussion may equally apply to the advertiser communication device 111-1. The mobile communication device 102-1 may be any portable device suitable for sending and receiving information over a network in accordance with embodiments described herein. For example without limitation, in various embodiments, the mobile communication device 102-1 may include one or more variously referenced as a mobile phone, a cellular telephone, a smartphone (for example without limitation, a smart phone such as: the iPhone® phone available from Apple Inc. of Cupertino, Calif.; Android™ operating system-based phones, available from as Google of Mountain View, Calif.; and/or the like), a handheld mobile device, a tablet computer, a web pad, a personal digital assistant (PDA), a notebook computer, a handheld computer, a laptop computer, a vehicle computer, and/or the like.

In some embodiments, the mobile communication device 102-1 may be provided with a mobile application 251, which may correspond to a client application configured to run on the mobile communication device 102-1 to facilitate various embodiments of this disclosure. For example without limitation, the mobile application 251 may transform the mobile communication device 102-1 into a call tracking facilitator. The mobile application 251 and the mobile communication device 102-1 may cooperate with the advertising information handling system 106 to facilitate tracking and/or handling of calls in response to advertisements presented through the mobile communication device 102-1. The mobile application 251 can be any computer program that can be installed and run on the end-user communication device 102-2.

In various embodiments, mobile communication device 102-1 configured with the mobile application 251 may provide one or more display screens that may each include one or more user interface elements. A user interface may include any text, image, and/or device that can be displayed on a display screen for providing information to a user and/or for receiving user input. A user interface may include one or more widgets, text, text boxes, text fields, tables, grids, charts, hyperlinks, buttons, lists, combo boxes, checkboxes, radio buttons, and/or the like.

As shown in FIG. 2, the mobile communication device 102-1 includes a display 230 and input elements 232 to allow a user to input information into the mobile communication device 102-1. By way of example without limitation, the input elements 232 may include one or more of a keypad, a trackball, a touchscreen, a touchpad, a pointing device, a microphone, a voice recognition device, or any other appropriate mechanism for the user to provide input. Further, the mobile communication device 102-1 the input elements 232 may include a communication component reader 250 for accepting a communication component such as a SIM card 276.

In some embodiments, the advertising information handling system 106 may provide advertisements of any suitable type to an end user 103 of the mobile communication device 102-1 through the mobile application 251. The mobile application 251 can include a utility that communicates with the advertising information handling system 106 to control downloading, displaying, caching, and/or other operations concerning the handling of advertisements. The mobile application 251 and the mobile communication device 102-1 may cooperate with the advertising information handling system 106 to facilitate call tracking in response to advertisements displayed through the one or more additional applications.

In some embodiments, the end-user communication device 102-2 may include one or more additional applications, for example, that may be provided by one or more publishers 112 and/or may provide functionality relating to one or more publishers 112. A publisher 112 may be any entity, including, for example, a news content provider, a social networking company, any business, a gaming company, a music vendor, a multimedia content provider, and/or the like. Advertisements of any suitable type may be displayed through the one or more additional applications. The mobile application 251 and the mobile communication device 102-1 may cooperate with the advertising information handling system 106 and to facilitate call tracking in response to advertisements displayed through the one or more additional applications. In some embodiments, the mobile application 251 could include a toolkit with client-side utility for interfacing with the one or more additional applications to facilitate tracking and/or call handling responsive to presented advertisements. In some embodiments, the one or more additional applications could include the toolkit. In some embodiments, the mobile application 251 could be grafted into the one or more additional applications to provide tracking and/or call handling functionalities. In some embodiments, the mobile application 251 could use a number of application programming interface (API) translation profiles configured to allow interface with the one or more additional applications.

The user selection of an advertisement may involve any one or combination of various user inputs. The user selection may be in the form of a keyboard/keypad input, a touch pad input, a track ball input, a mouse input, a voice command, etc. For example, the advertisement may be selected by the user by pointing and clicking on the advertisement. As another example, the advertisement may be selected by an appropriate tap or movement applied to a touch screen or pad of the mobile communication device 102-1. The selection of an advertisement may initiate a telephone call. In some embodiments, a telephone number may be presented in content information in a format such that, when the user selects a communication reference, the user device (e.g., a cellular phone or a computer) dials a telephone number corresponding to the communication reference. For example, the call could have been initiated by end user selecting a click-to-call option displayed via the user device. In some embodiments, user devices can automatically dial the telephone number. For example, a Dual Tone Multi-Frequency (DTMF) generator can dial a phone number. In some embodiments, the user device may initiate the phone call through a VoIP system.

In some embodiments, the mobile application 251 can run continuously (e.g., in the background) or at other times, such as when the mobile application 151 is launched by an end user 103. In certain embodiments, the mobile application 251 can automatically run each time that a user accesses the one or more additional applications or selects an advertisement. The mobile application 251 may be provided in any suitable way. For non-limiting example, the mobile application 251 may be made available from the advertising information handling system 106, a website, an application store, etc. for download to the mobile communication device 102-1; alternatively, it may be pre-installed on the mobile communication device 102-1. In some embodiments, the mobile application 251 can be pre-installed on the device platform by a mobile communication device manufacturer or carrier. In some embodiments, a mobile application 251 can be downloaded and installed by an end-user 102 on their end-user communication device 102-2.

The mobile communication device 102-1 includes a memory 234 communicatively coupled to a processor 236 (e.g., a microprocessor) for processing the functions of the mobile communication device 102-1. The mobile communication device 102-1 may include at least one antenna 238 for wireless data transfer to communicate through a cellular network, a wireless provider network, and/or a mobile operator network, such as GSM, for example without limitation, to send and receive Short Message Service (SMS) messages or Unstructured Supplementary Service Data (USSD) messages. The mobile communication device 102-1 may also include a microphone 240 to allow a user to transmit voice communication through the mobile communication device 102-1, and a speaker 242 to allow the user to hear voice communication. The antenna 238 may include a cellular antenna (e.g., for sending and receiving cellular voice and data communication, such as through a network such as a 2G or 4G network). In addition, the mobile communication device 102-1 may include one or more interfaces in addition to the antenna 238, e.g., a wireless interface coupled to an antenna. The communications interfaces 244 can provide a near field communication interface (e.g., contactless interface, Bluetooth, optical interface, etc.) and/or wireless communications interfaces capable of communicating through a cellular network, such as GSM, or through Wi-Fi, such as with a wireless local area network (WLAN). Accordingly, the mobile communication device 102-1 may be capable of transmitting and receiving information wirelessly through both short range, radio frequency (RF) and cellular and Wi-Fi connections.

Additionally, the mobile communication device 102-1 can be capable of communicating with a Global Positioning System (GPS) in order to determine to location of the mobile communication device 102-1. The antenna 238 may include GPS receiver functionality. In other embodiments contemplated herein, communication with the mobile communication device 102-1 may be conducted with a single antenna configured for multiple purposes (e.g., cellular, transactions, GPS, etc.), or with further interfaces (e.g., three, four, or more separate interfaces).

The mobile communication device 102-1 can also include at least one computer-readable medium 246 coupled to the processor 236, which stores application programs and other computer code instructions for operating the device, such as an operating system (OS) 248. In some embodiments, the mobile application 251 may be stored in the memory 234 and/or computer-readable media 246. In some embodiments, the mobile application 251 may be stored on the SIM card 276. In some embodiments, mobile communication device 102-1 may have cryptographic capabilities to send encrypted communications and/or messages protected with message hash codes or authentication codes.

Figure 3:
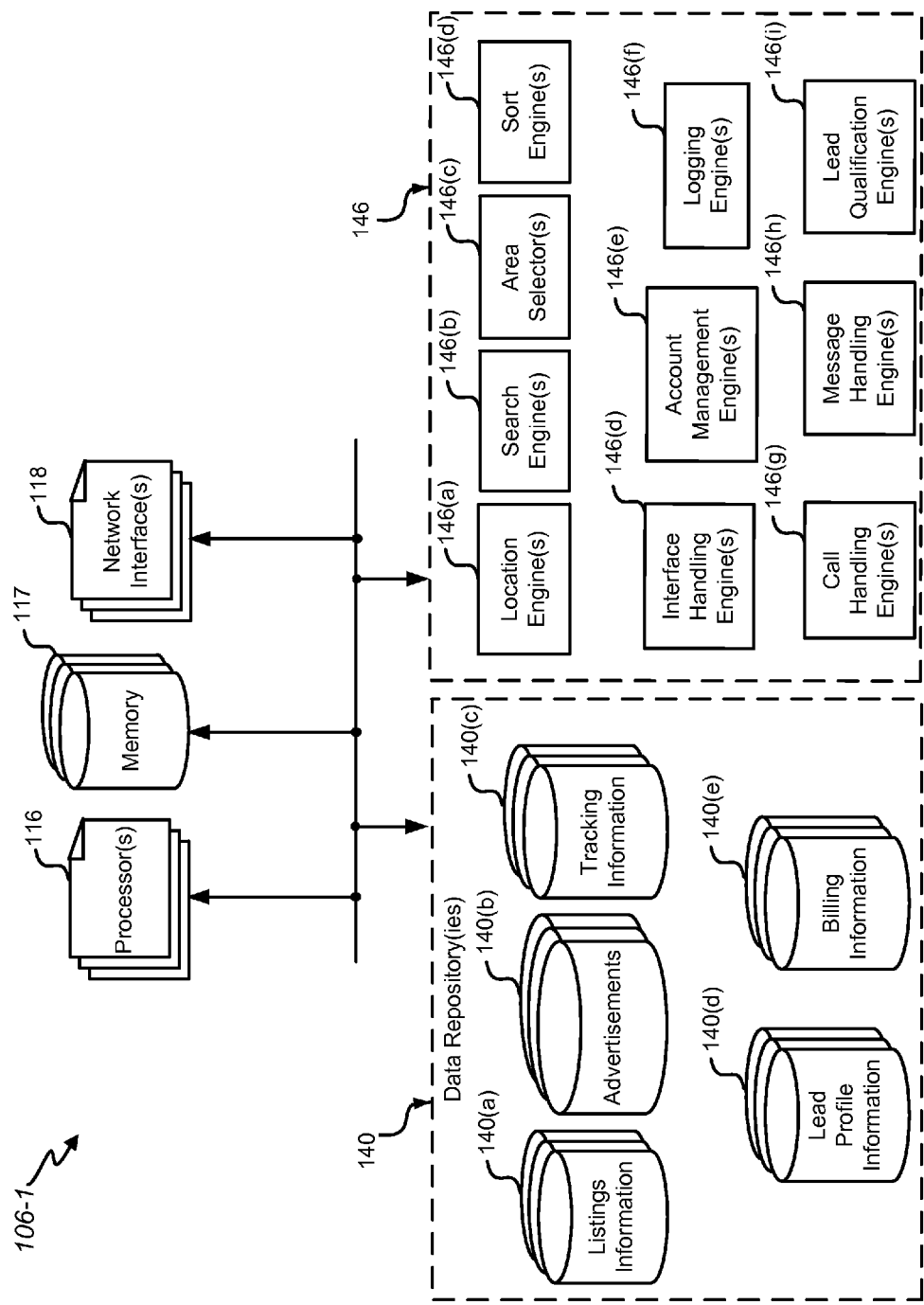
FIG. 3 depicts a high-level block diagram of an advertising information handling system, in accordance with certain embodiments of the present disclosure.

FIG. 3 shows a high-level block diagram of an advertising information handling system 106-1, in accordance with certain embodiments of the present disclosure. The system 106-1 may correspond to the system 106 of FIG. 1, but one embodiment of the system 106 is shown in more detail. While engines, repositories, and other components are described separately herein, it should be appreciated that the components may be combined and/or implemented differently in any combination to provide certain features in various embodiments. In various embodiments, different processes running on one or more shared computers may implement some of the components.

In various embodiments, the advertising information handling system 106-1 may include any device or set of devices configured to process, send, receive, retrieve, detect, generate, compute, organize, categorize, qualify, store, display, present, handle, or use any form of information and/or data suitable for the embodiments described herein. The advertising information handling system 106-1 may include a single computing device or multiple computing devices, which, in some embodiments, may be implemented in or with a distributed computing and/or cloud computing environment. The advertising information handling system 106-1 may include one or more processing resources communicatively coupled to one or more storage media, random access memory (RAM), read-only memory (ROM), and/or other types of memory. The advertising information handling system 106-1 may include any one or combination of various input and output (I/O) devices, network ports, and display devices.

The advertising information handling system 106-1 may be, correspond to, and/or include one or more servers that, in various embodiments, may include one or more switches and/or media gateways, such as telephone, messaging, email, application, and/or other types of gateways. One or more network interfaces 118 may be communicatively coupled to processors 116. In various embodiments, one or more of the processor(s) 116, memory 117, and/or network interface(s) 118 may correspond to the one or more servers. The network interface(s) 118 may include any suitable input/output module or other system/device operable to serve as an interface between one or more components of the advertising information handling system 106 and the one or more networks 104. The advertising information handling system 106-1 may use the network interfaces 118 to communicate over the networks 104 using any suitable transmission protocol and/or standard.

In some embodiments, a server may communicate with a mobile communication device 102 via HyperText Transfer Protocol (HTTP) and/or other types of communication protocols, such as File Transfer Protocol (FTP), Wireless Application Protocol (WAP), etc. In some embodiments, a server may provide static web pages, dynamic web pages, and/or web services. In some embodiments, a server may provide web applications to a mobile communication device 102 for execution in a web browser running on the mobile communication device 102; and the web applications may include scripts for execution within an isolated browser environment. In some embodiments, a server may provide rich-client applications to a mobile communication device 102; and the rich-client application may be programmed to have access to functions of the operating system running on a mobile communication device 102.

Certain embodiments may provide a multi-channel communication regime to coordinate multiple communication channels to communicate with elements of system 100. Multiple communication pipes within a communication pipe could be implemented according to certain embodiments. Some embodiments may implement a greater number of communication channels. For example without limitation, one set of channels could be used for data communication to a client application, and one set of channels could be used for voice communication. The system can use web communication, text communication, voice communication, e-mail communication, push notification, and/or the like.

The advertising information handling system 106-1 may include one or more data repositories 140. In various embodiments, the data repository(ies) 140 may be implemented in various ways. The data repositories 140 may include database(s), database management system(s), server(s) to facilitate management/provision/transfer of information, and/or the like. For example without limitation, one or more data processing systems may store information. One or more relational or object-oriented databases, or flat files on one or more computers or networked storage devices, may store information. In some embodiments, a centralized system stores information; alternatively, a distributed/cloud system, network-based system, such as being implemented with a peer-to-peer network, or Internet, may store information. Various information related to given subscriber/user may be linked in any suitable manner.

In some embodiments, one or more servers may provide listings information 140(*a*) with links to detail information, such as a map, business hours, driving directions, etc. The server(s) may provide user interfaces for the users to rate the listings information 140(*a*), provide reviews, view reviews from other users, make reservations via the listings information 140(*a*), make purchases via the listings information 140(*a*), etc. The server(s) can track various different types of user interactions with the listings to determine or estimate the level of user interest in the listings. The servers may provide rich client applications for execution in the mobile computing device to provide the user interfaces. The server(s) may be communicatively coupled to one or more of a location engine(s) 146(*a*), a search engine(s) 146(*b*), an area selector(s) 146(*c*), and/or a sort engine(s) 146(*d*) to process the search request and present search results based on the information stored in one or more data repositories 140.

In some embodiments, the location engine(s) 146(*a*) may include one or more engines and may use GPS coordinates, cellular tower triangulation techniques, Wi-Fi-based location information, carrier-provided location information, and/or other location determination systems to identify a location of the mobile communication device 102. In some embodiments, the location engine 146(*a*) determines a location of interest to the end user 103 related to a search request. In some embodiments, the location engine 146(*a*) determines a location of interest to the end user 103 related to a phone call initiated with the mobile communication device 102. The location of interest may be based on a location of the mobile communication device 102. In some embodiments, the end user 103 may explicitly specify the location of interest in a search request; and the location engine 146(*a*) extracts the location of interest from the search request. In some embodiments, a location of interest may be based on end-user information stored for a particular end user 103 and associated with identification information of the end user 103 or the mobile communication device 102. In some embodiments, the end user 103 may specify some or all of the end-user information.

In some embodiments, the location engine 146(*a*) may determine the location of the mobile communication device 102 based on a connection point the device 102 used to access the network(s) 104 (e.g., based on the location of a wireless network access point, a base station of a cellular communication system, or a connection point to a wired network). In some embodiments, the device 102 automatically determines its current position (e.g., via a satellite positioning system, or a cellular positioning system) and transmits the determined or estimated position to a server with the search request, or provides the position in response to a request from the location engine 146(*a*).

In some embodiments, the one or more data repositories 140 may include one or more listings information repositories 140(*a*) that may retain any suitable information about business entities, any local listings information suitable for embodiments of this disclosure, such as business, product, and service information, and/or the like. In certain embodiments, the local listings information may correspond to directory information of the kind available via Yellow Pages services and the like. The listings 140(*a*) may include addresses, telephone numbers, advertisements, announcements, and/or end-user information, etc.

In some embodiments, advertisement units may be stored in one or more advertisement repositories 140(*b*). The advertisement units may correspond to any of various types of advertisement products. For example, the advertisement units may correspond to one or more of subscription advertisements, pay-per-call advertisements, presence advertisements, cost-per-click advertisements, cost-per-impression advertisements, display advertisements, and/or the like. The advertisement units may correspond to any of various types of media. For example, the advertisement units may correspond to one or more of web, mobile, social, video, and/or the like.

Listings 140(*a*) and/or advertisements 140(*b*) of businesses or people, such as restaurants, car dealers, retailer locations, advertisers, gas stations, parking lots, plumbers, and the like, may have street addresses or other location parameters, such as longitude and latitude coordinates, stored as locations in one or more location information repositories. Thus, the listings 140(*a*) may be associated with locations. The locations may be part of the listings 140(*a*), or associated with the listings 140(*a*). In some embodiments, the listings 140(*a*) include information related to business entities at corresponding locations. The entities may be businesses or people.

In some embodiments, the one or more data repositories 140 may include one or more tracking information repositories 140(*c*). The one or more tracking information repositories 140(*c*) may retain any information suitable to facilitate tracking, linking, and/or routing of calls, messages, end-user interactions, advertiser interactions, and/or the like according to various embodiments. The one or more tracking information repositories 140(*c*) may retain any authentication information, including, for example without limitation, the authentication information may unique user identification information, unique device identification information, International Mobile Subscriber Identity (IMSI) information, password information, and/or the like. The one or more tracking information repositories 140(*c*) may retain any phone number information pertinent to domestic mobile network phone numbers and foreign mobile network phone numbers. Other types of retained information could include information relating to devices that subscriber uses and has used to interface with the system. For example without limitation, information about the specific devices, device configurations, and/or device capabilities that a gives subscriber uses could be tracked and retained in a repository. The one or more tracking information repositories 140(*c*) may retain any call content information, call data, and/or the like to facilitate various embodiments herein.

In some embodiments, the one or more data repositories 140 may include one or more lead profile information repositories 140(*d*). The one or more lead profile information repositories 140(*d*) may retain any information suitable to facilitate tracking, linking, and/or otherwise processing lead profile according to various embodiments. Such lead profile information is discussed further herein.

In some embodiments, the one or more data repositories 140 may include one or more lead billing information repositories 140(*e*). The one or more lead billing information repositories 140(*e*) may retain any information suitable to facilitate tracking, linking, implementation of business rules, and/or otherwise processing information corresponding to billing advertisers/publishers according to various embodiments. Various aspects of billing according to various embodiments, such as billing based on lead qualification, are discussed further herein.

The advertising information handling system 106-1 may include one or more of engines 146 and/or modules that may be stored in the one or more memories and may include one or more software applications, executable with the processors, for receiving and processing requests. The one or more of engines 146 and/or other modules may be configured to perform any of the steps of methods described in the present disclosure. The one or more of engines 146 may include one or more of location engine(s) 140(*a*), search engine(s) 140(*b*), area selector(s) 140(*c*), and/or sort engine(s) 140(*d*). The one or more of engines 146 may include interface handling engine(s) 146(*d*) that may include logic to send, present, and receive information, with one or more of the interfaces to/from one or more subscribers and/or network components. The interface handling engine(s) 146(*d*), with one or more the processors 116, may utilize one or more network interfaces 118 to transceive information through the networks 104. The system 106 may pull and/or push information from those entities in any suitable way. For example without limitation, the system 106 may pull and/or push information from a mobile communication device 102 configured with a client application to facilitate features of embodiments discussed herein.

The one or more of engines 146 may include account management engine(s) 146(*e*) that may include logic for implementing account features in various embodiments. By way of example without limitation, the account management and/or billing engine(s) 146(*e*) may include logic one or more aspects of: handling user registration; managing account creation, updates, authentication, handling; handling purchases; handling billing of advertisers/publishers; and/or the like. The account management engine(s) 146(*e*) may be configured for acquiring, processing, formatting, and/or storing account and/or authentication information in the one or more repositories 140.

The one or more of engines 146 may include logging engine(s) 146(*f*) that may include logic for implementing information logging features in various embodiments. By way of example without limitation, the logging engine(s) 146(*f*) could process data pulled and/or pushed from various entities. The logging engine(s) 146(*f*) could handle process, extracting, formatting, and/or storing/recording data including call data and call content in one or more of the aforementioned repositories. The logging engines 146 may be configured to perform logging processes to receive and log data of interest for advertisements and/or listings. In some embodiments, one or more lead data analytics modules may include logic to retrieve, process, derive, compile, aggregate, handle, store, report, and/or present information relating to lead data. With respect to a particular advertiser, the logging and performance analytics may facilitate various features of an advertiser interface for an advertising platform, in accordance with certain embodiments herein.

Data of interest could indicate a manner in which a user interacted with an advertisement. Data of interest could include call data. For example, data could be indicative of calls responsive to advertisements and/or listings. Data could be indicative of call-backs from a publisher's server. Data could be indicative of a number of calls that are responsive to a particular advertisement from end users in a certain time period. For pay-per-call ads, calls may be logged in to a call center, such as one implemented with the call handling module. Using tracking numbers, the phone number that was dialed by a user could be mapped to advertisers, advertisements, and/or publishers. In various embodiments, phone numbers and/or extensions, which may or may not include aliases, may be assigned to advertisers as unique to advertisements, as shared by certain advertisements, as unique to an advertiser, as shared by certain advertisers, as unique to a publisher, as shared by certain publisher, and/or on any suitable basis. For example, in some embodiments, a publisher may be assigned a single number for a set of advertisers. In some embodiments, an extension may be assigned to the publisher for each of the advertisers. In some embodiments, an advertiser may receive a single/base telephone number for a set of publishers. In some embodiments, an extension may be assigned to the advertiser for each of the publishers.

In some embodiments, the logging engine(s) 146(*f*) may include tracking logic to track calls, in accordance with certain embodiments. In some embodiments, the logging engine(s) 146(*f*) may be configured to identify whether a caller is successfully connected with an advertiser, whether the call is missed, whether the call is dropped/disconnected/ receives a busy tone, whether the call is routed to voicemail, and/or whether a voicemail is left. In some embodiments, the logging engine(s) 146(*f*) may include ANI logic to identify numbers of callers. In some embodiments, the logging engine(s) 146(*f*) may be configured to track the length of calls or other calls aspects. In some embodiments, the logging engine(s) 146(*f*) may be configured to record and/or transcribe calls. In some embodiments, the logging engine(s) 146(*f*) may be configured to identify and capture keywords from calls.

Data of interest could include click data. For example, data could be indicative of clicks to advertisements. For example, data could be indicative of a number of clicks, whether by logging the direct request of the clicks or a concomitant tracker, that a particular advertisement received from end users via computing device in a certain time period.

The one or more of engines 146 may include call handling module(s) 146(*g*) that may include logic to implement and/or otherwise facilitate any call handling features discussed herein. By way of example without limitation, the call handling module(s) 146(*g*) may be configured to one or more of decode, route, and/or redirect calls to/from subscribers and advertiser representatives. Similarly, the one or more of engines 146 may include message handling module(s) 146(*h*) that may include logic to implement and/or otherwise facilitate any message handling features discussed herein.

The one or more of engines 146 may include lead qualification module(s) 146(*i*) that may include logic to implement and/or otherwise facilitate any lead qualification features discussed herein. By way of example without limitation, the lead qualification module(s) 146(*i*) may be configured to one or more of qualify a lead according to a graduated lead scale, categorize a lead according to a category scheme, score a lead according to a lead scoring scheme, and/or the like. Various aspects of lead qualification according to various embodiments are discussed further herein. In certain embodiments, the lead qualification module(s) 146(*i*) may be configured to compile keyword criteria, for example, in an ontology. The lead qualification module(s) 146(*i*) could include an ontology reasoner or semantic reasoning module to make logical inferences from a set of facts in the ontology. Accordingly, the lead qualification module(s) 146(*i*) may correspond to a reasoning engine configured to effect one or more lead qualification features discusses herein. A pattern-based reasoner could be employed to use various statistical techniques in analyzing call/lead data in order to make inferences based on the analysis. A transitive reasoner could be employed to infer relationships from a set of relationships related to call/lead data.

In some embodiments, one computer system implements one or more of the components of the system 106-1. Alternatively, different processes running on one or more shared computers may implement some of the components. For example without limitation, one computing module, thread, or process may implement multiple of the components. In some embodiments, special purpose data processing systems implement the one or more of the components. In some embodiments, processes running according to software instructions on general purpose data processing systems, such as general purpose personal computers or server computers, can implement the components. Thus, the implementations are not limited to particular hardware, software, or particular combinations of hardware and software.

Figure 4:
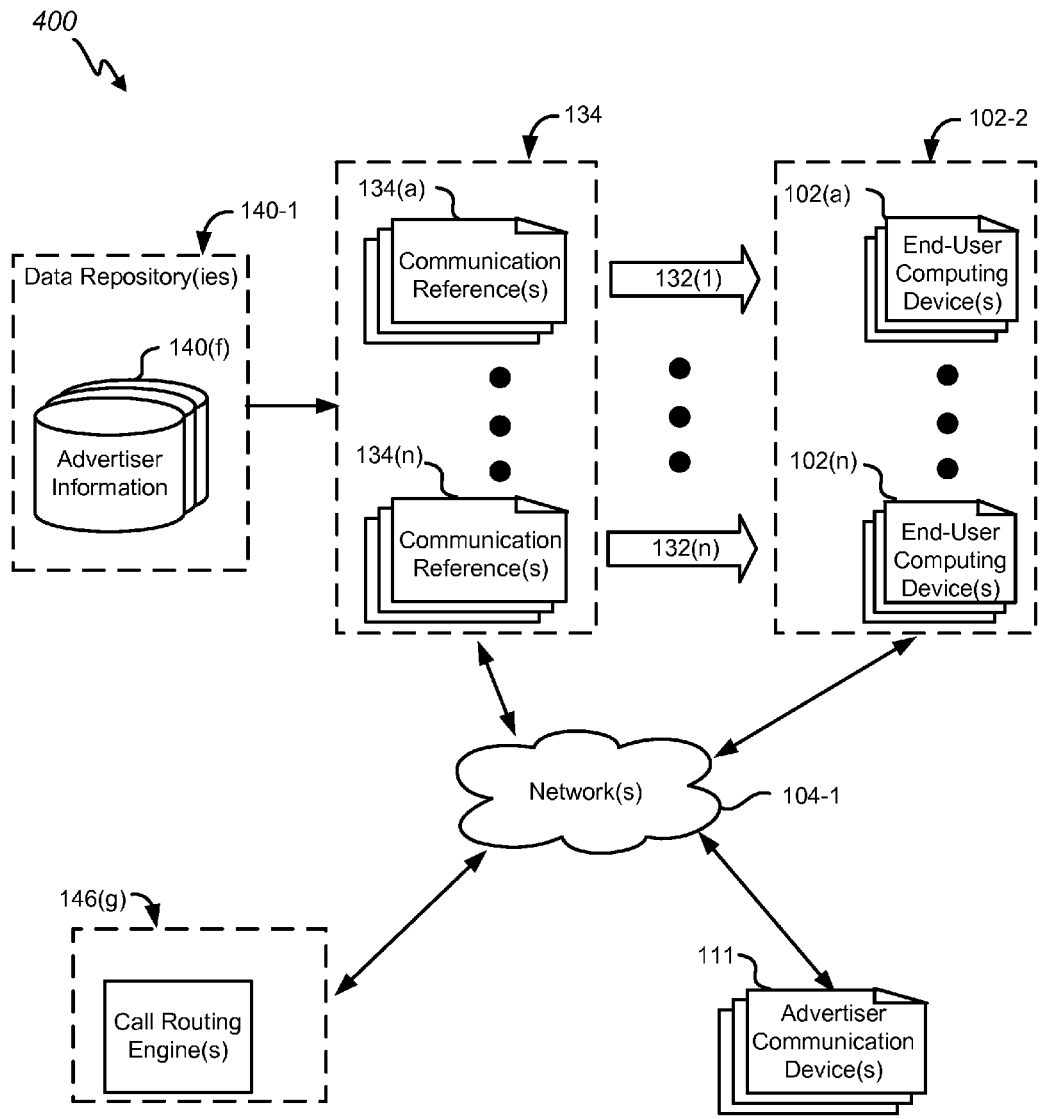
FIG. 4 depicts a diagram of a system for call handling, in accordance with certain embodiments of the present disclosure.

FIG. 4 shows a diagram of a system 400 for call handling, in accordance with certain embodiments of the present disclosure. The system 400 may correspond to certain embodiments addressed with respect to other figures herein. The system 400 may include one or more data repositories 140-1. The one or more data repositories 140-1 may correspond to the data repositories 140 of FIG. 3 in some embodiments. In some embodiments, the one or more data repositories 140-1 may include one or more advertiser information repositories 140(f). In some embodiments, the advertiser information repositories 140(f) may correspond to the listings information repositories of FIG. 3. The advertiser information repository 140(f) may contain phone numbers of target phones. Typically, the target phones belong to advertisers, which may correspond to one or more of institutions, businesses, individuals, etc. that seek publicity through various media channels, such as web servers, WAP servers, short messaging services, etc., which may or may not use the network 104-1.

In some embodiments, communication references 134 may be provided to the end-user computing devices 102-2. The communication references 134 may allow routing of calls from end-user devices at least partially based on location in accordance with certain embodiments of this disclosure. In various embodiments, the communication references 134 may be delivered with content information (e.g., web page, WAP page, short message, television programs, news articles, etc.) to end-user computing devices 102. In some embodiments, a communication reference 134 may be a phone number. The phone number could indicate a category of advertisers. In some embodiments, a communication reference 134 may facilitate a click-to-call feature.

In embodiments where an end-user computing device 102-2 is a mobile device, content information, including advertisements, may be transferred to the device through wireless communication connections, such as cellular communication links, wireless access points for wireless local area network, etc. In some embodiments, an end-user computing device 102-2 can receive content information from multiple types of media channels 132 (e.g., a web server, a WAP server, a SMSC, etc.). In some embodiments, an end-user computing device 102-2 may be able to initiate a phone call (e.g., automatically dialing according to the encoded phone number embedded in the content information when a user selects the number).

In some embodiments, dialing a phone number corresponding to a communication reference 134 may connect the phone call to a call handling module 146(g). The call handling module 146(g) may include one or more call routing engines. The call routing engine may include one or both of a router and a decoder. In some embodiments, based at least partially on the communication reference selected, such as a phone number dialed and/or a call button selected, the call routing engine may determine one or more corresponding target communication references using the advertiser information repository 140(d) and may connect the phone call to one or more target advertisers 110-1 through the network 104-1.

The network 104-1 may correspond to the network 104 in some embodiments. In some embodiments, the network 104-1 be or include a telephone network. In some embodiments, a telephone network 104-1 may overlap at least a portion of the network 104. The telephone network 104-1 may be circuit switched, package switched, or partially circuit switched and partially package switched. For example, the telephone network may partially use the Internet to carry the phone call (e.g., through VoIP). For example, a connection between an end-user device 102 and the call routing engine may be carried using VoIP; and the connection between a router and a decoder of the call routing engine may be carried using a land-line based, circuit-switched telephone network.

Figure 5:
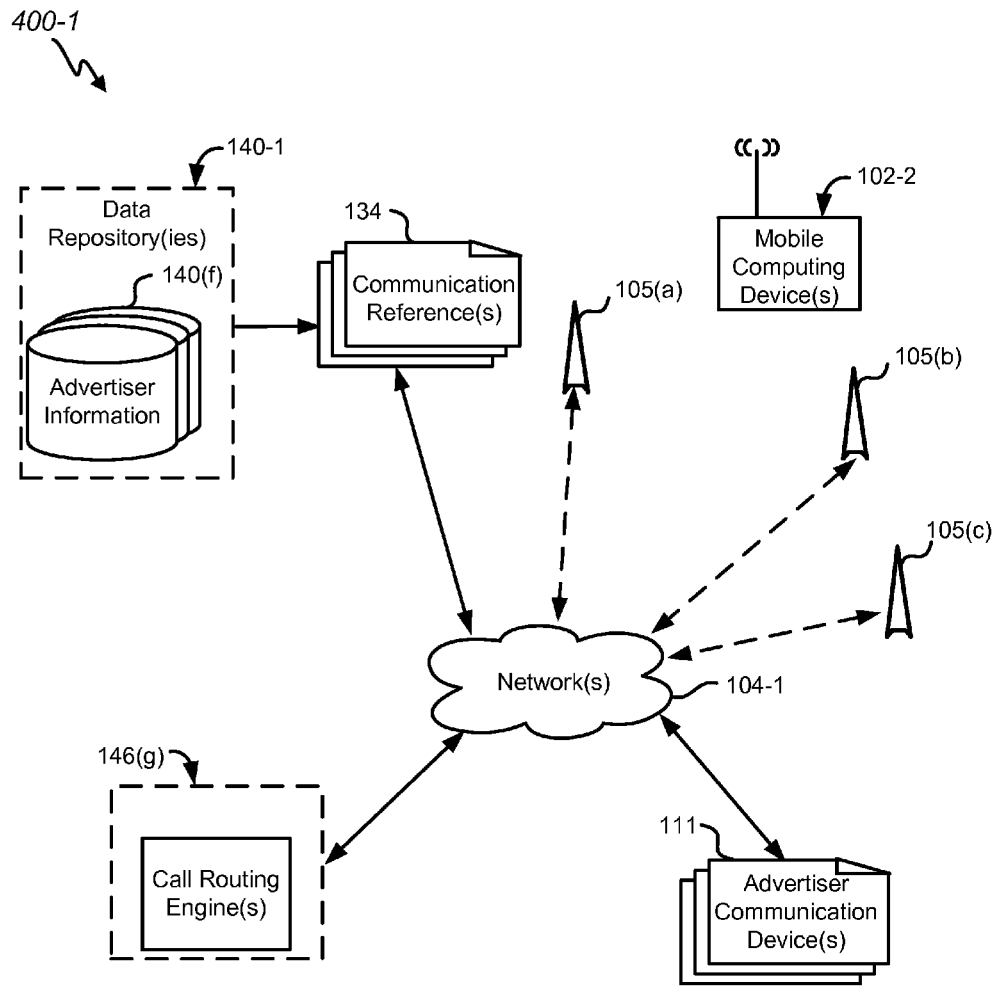
FIG. 5 depicts a diagram of a system for call handling, in accordance with certain embodiments of the present disclosure.

FIG. 5 shows a diagram of a system 400-1 for call handling, in accordance with certain embodiments of the present disclosure. The mobile computing device(s) 102-1 may access the network 104-1 through a wireless link to an access point. For example, the mobile computing device(s) 102-1 may access the network 104-1 through one or more of access point 105(a), access point 105(b), access point 105(c), and/or any other suitable access point(s). The access points 105 may be of any suitable type or types. For example, an access point 105 may be a cellular base station, an access point for wireless local area network (e.g., a WiFi access point), an access point for wireless personal area network (e.g., a Bluetooth access point), etc. The access point 105 may connect the mobile computing device 102 to the network 104-1, which may include the Internet, an intranet, a local area network, a public switched telephone network (PSTN), private communication networks, etc. In some embodiments, access point(s) may be used in obtaining location information for the mobile computing device 102, as described further herein.

Figure 6:
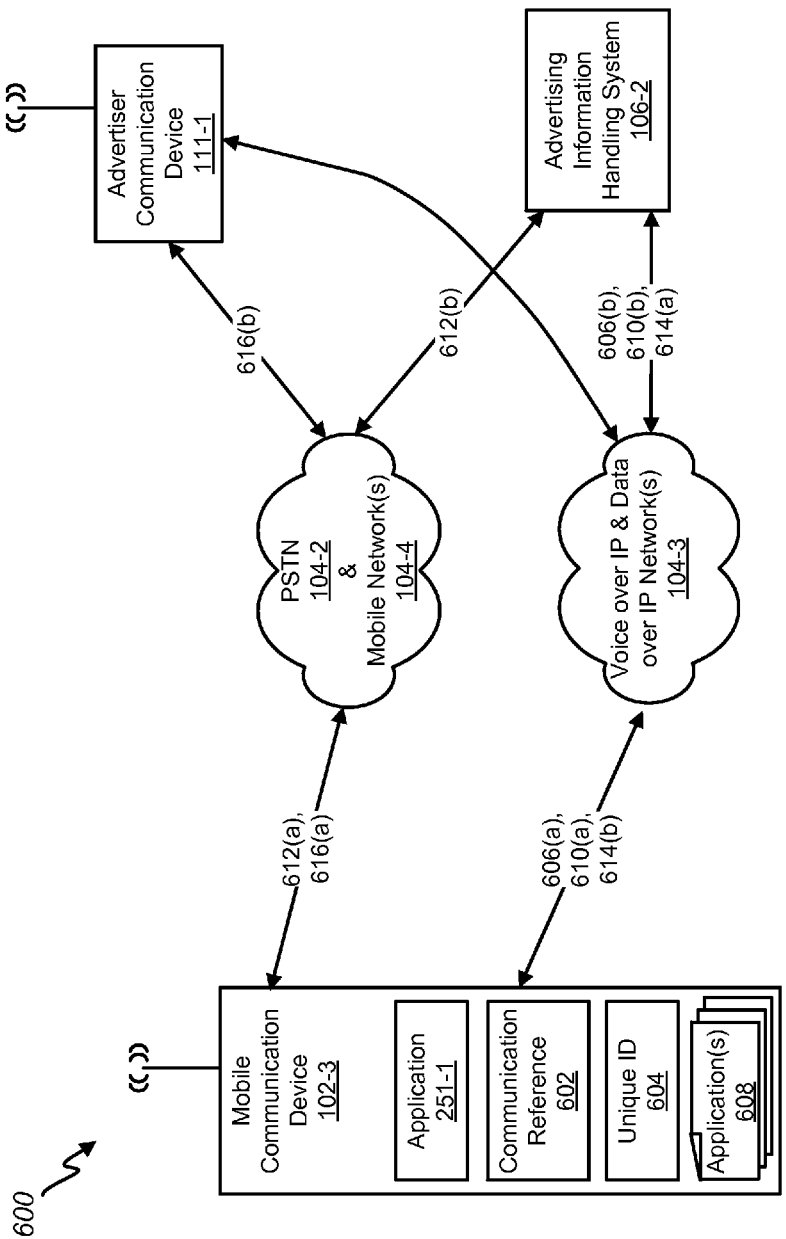
FIG. 6 depicts a high-level block diagram of a system, in accordance with certain embodiments of the present disclosure.

FIG. 6 depicts a high-level block diagram of a system 600, in accordance with certain embodiments of the present disclosure. The system 600 may correspond to certain embodiments of the system 100. Certain embodiments may allow for tracking of a great number of businesses, where the tracking is not limited by a telephone number inventory. Previously, call tracking numbers were essential for call tracking, being the only means to tie an offline activity to a phone call that can be tracked. Static phone numbers were provisioned for call tracking so that, when a call to a particular number came through the PSTN, the business to which the number was assigned had to be determined. However, certain embodiments may provide for technological improvements that allow for control over sequences of activities after a user initiates a response to an advertisement.

The mobile communication device 102-3 configured with the mobile application 251-1 may be configured to associate the mobile application 251-1 with a communication reference 602 of the mobile communication device 102-3. In some embodiments, the communication reference 602 is a telephone number associated with the mobile communication device 102-3. In some embodiments, the mobile application 251-1 may gather the telephone number from the device, a carrier associated with device subscriber, or via input of the end user 103. In some embodiments, the mobile application 251-1 may register unique identification information 604 associated with the mobile communication device 102-3. For example without limitation, the mobile application 251-1 may gather the information 604 from the mobile communication device 102-3. In some embodiments, unique identification information 604 may be gathered from a SIM card 276 or another card of the mobile communication device 102-3. In some embodiments, unique identification information 604 may be gathered from other components of the mobile communication device 102.

The unique identification information 604 may be sent by the mobile communication device 102-3 to the advertising information handling system 106-2. The unique identification information 604 could include any suitable subscriber identity information. In some embodiments, the unique identifier may include an IMSI. In some embodiments, the unique identifier may be derived from the IMSI such that the actual IMSI is not sent. In some embodiments, a hash code based on the IMSI may be sent. The unique identifier may indicate associated network location information in some embodiments.

In some embodiments, to provision tracking service, the mobile communication device 102-3 configured with the mobile application 251-1 may send provisioning information to the advertising information handling system 106-2. The provisioning information may indicate communication reference information 602. For example without limitation, as indicated by interfaces 606(a) and 606(b), the mobile communication device 102-3 may send phone number information to the advertising information handling system 106-2. In some embodiments, the provisioning information could be sent to a mobile switching center (MSC) and/or HLR (home location register), which could then convey the information to the advertising information handling system 106. In some embodiments, the provisioning information could be sent via SMS messaging, as indicated by interfaces 612(a) and 612(b). For example without limitation, SMS messaging may be sent to the advertising information handling system 106-2 via one or more of a home carrier MSC, a home carrier SMSC, an intercarrier SMS gateway, serving carrier SMSC, a mobile network 104-4, a serving carrier MSC and/or visitor location register (VLR), and/or the like.

Provisioning could be initiated with launching and/or installing the mobile application 251-1. The provisioning information may be sent to the advertising information handling system 106 via an Internet Protocol (IP) message via one or more IP networks, such as network(s) 104-3. In some embodiments, the provisioning information may include the subscriber's Mobile Directory Number (MDN) for CDMA networks or Mobile Subscriber Integrated Services Digital Network Number (MSISDN) for GSM networks. In some embodiments, the mobile communication device 102-3 configured with the mobile application 251-1 may also send provisioning information that includes the device's unique equipment identity 604. When necessary, the advertising information handling system 106-2 could request the subscriber's unique subscriber identity from the home location register associated with the MDN or MSISDN. The advertising information handling system 106-2 may store the provisioning information in one or more data repositories 140. In some embodiments, after the advertising information handling system 106-2 receives the provisioning information, it may send a confirmation message to the mobile application 251-1, as indicated by interfaces 614(a) and 614(b).

As previously discussed, in some embodiments, the advertising information handling system 106-2 may provide advertisements through the mobile application 251-1. In some embodiments, advertisements may be displayed through the one or more additional applications 608 of the mobile communication device 102-3, such as a browser, an SMS application, a push notification, an email application, a social media application, etc. In some embodiments, the mobile application 251-1 could include a toolkit with client-side utility for interfacing with the one or more additional applications to facilitate tracking and/or call handling responsive to presented advertisements. Various embodiments may present advertisements in any one or combination of ways. In some embodiments, the one or more additional applications 608 could include a toolkit for interfacing with the mobile application 251-1. In some embodiments, the mobile application 251-1 could be grafted into the one or more additional applications to provide tracking and/or call handling functionalities. In some embodiments, the mobile application 251-1 could use one or more API translation profiles configured to allow interface with the one or more additional applications 608.

The end user 103 may select a user-selectable call option presented with the mobile communication device 102-3 responsive to an advertisement presented via the mobile communication device 102-3 either via the mobile application 251-1 or via another application, in accordance with various embodiments. In some embodiments, the user-selectable call option and the advertisement may be integrated, for example without limitation, with an advertisement with a click-to-call option. In some embodiments, responsive to the user selection, a call may be placed to an advertiser communication device 111-1, as indicated by interfaces 616(a) and 616(b).

Responsive to the user selection, the mobile communication device 102-3 configured with the mobile application 251-1 may send one or more communications corresponding to the advertisement, via a data network, to the advertising information handling system 106, as indicated by interfaces 610(a) and 610(b). By way of example without limitation, the one or more communications may include one or more IP messages sent via one or more IP networks, such as network(s) 104-3. The one or more messages may convey tracking information. The tracking information could indicate call information. By way of example without limitation, the call information could correspond to the telephone number, the subscriber identity, the device identification, the IMSI, and/or any suitable information associated with the mobile communication device 102-3.

In some embodiments, advertisements are presented to a user via the mobile application 251-1 such that the mobile application 251-1 is configured to gather tracking information about those advertisements. In some embodiments, calls are placed or at least initiated via the mobile application 251-1 such that the mobile application 251-1 is configured to gather tracking information about those calls. In some embodiments, the mobile application 251-1 receives, pulls, extracts, and/or listens to information from one or more applications 608 of the mobile communication device 102-3 to gather tracking information, where advertisements are presented via the one or more applications 608 and/or calls are placed or at least initiated via the one or more applications 608. In some embodiments, tracking information may include call information gathered from a phone application 608 of the mobile communication device 102-3.

The call information could include information indicating a successfully connected call, a call duration, an indication that a call was not connected, information indicating a call was missed by the callee, an indication that a busy tone was received, an indication that a call was dropped, and/or the like. The call information could include a callee communication reference. For example without limitation, callee communication reference information could include one or more of a telephone number, IP address, etc. of the business/service provider/representative linked to the advertisement and/or the like.

Call information may be transmitted to the advertising information handling system 106-2 at any suitable times in various embodiments. In some embodiments, call information corresponding to a caller and one or more calls may be compiled and transmitted post call. In various embodiments, one or more sets of call information may be transmitted before a call is connected to an advertiser, during a call that has been connected, and/or post call. For example, captured data about pre-call call activities (discussed further herein) could be transmitted in real time as activities occur, consequent to the user selecting an option to contact the advertiser (e.g., selecting a click-to-call option), during a call to an advertiser, and/or after a call has concluded. In certain cases, information about pre-call activities may be useful to an advertiser deciding whether to accept a call, and, thus, such information may be indicated to the advertiser via the advertising platform. In certain cases, information about pre-call activities may be useful to an advertiser during the call, and, thus, such information indicated during the call via the platform. With some embodiments, the system may gather additional tracking information retained by the system in a repository and may provide additional tracking information to an advertiser prior to the advertiser accepting the call, during the call, and/or after the call.

In some embodiments, the mobile application 251-1 may be configured to gather call information about call-backs from advertiser representatives. Having logged the callee communication reference, the mobile application 251-1 could identify an incoming call from the previously called representative. In various embodiments, in the same or similar manner with respect to tracking information for calls initiated by the user, any suitable tracking information about the call-back may be collected.

In some embodiments, tracking information may be inferred, for example, in the absence of explicit tracking information. For example without limitation, the mobile application 251-1 and/or the advertising information handling system 106 may infer from a short call duration that a call was missed by a representative of an advertiser. The mobile application 251-1 and/or the advertising information handling system 106 may infer from subsequent user selections of the mobile application 251-1 and/or other applications 608 within a short time period after the initial user selection that a call was potentially missed by a representative of an advertiser. Accordingly, the mobile application 251-1 may send one or more communications via a data network that include any suitable tracking information to inform the advertising handling system 106, which may include application server(s), network switch(es), etc., about user action relating to advertisements.

In various embodiments, tracking information may include any suitable information about particular advertisements. Tracking information could include, for example without limitation, any reference information for the advertisement and/or other information identifying an advertisement, an advertiser, etc. In some embodiments, tracking information could include information relating to content of advertisements, for example without limitation, content details such as a value and/or offer associated with an advertisement; a date associated with an advertisement, such as an expiration date, an effective offer date or date range; products and/or services to which an advertisement is directed; and/or the like.

In some embodiments, tracking information could include information relating to time information associated with an advertisement. For example without limitation, tracking information could include any information relating a time when an advertisement was presented to a user. In some embodiments, tracking information could include information relating to advertisement presentation details. For example without limitation, tracking information could include any information relating to the time, manner, and/or place of presentation of an advertisement. Tracking information could include any information indicating the publisher of an advertisement. In some embodiments, tracking information could include location information relating to location of the mobile communication device 102-3.

Figure 7:
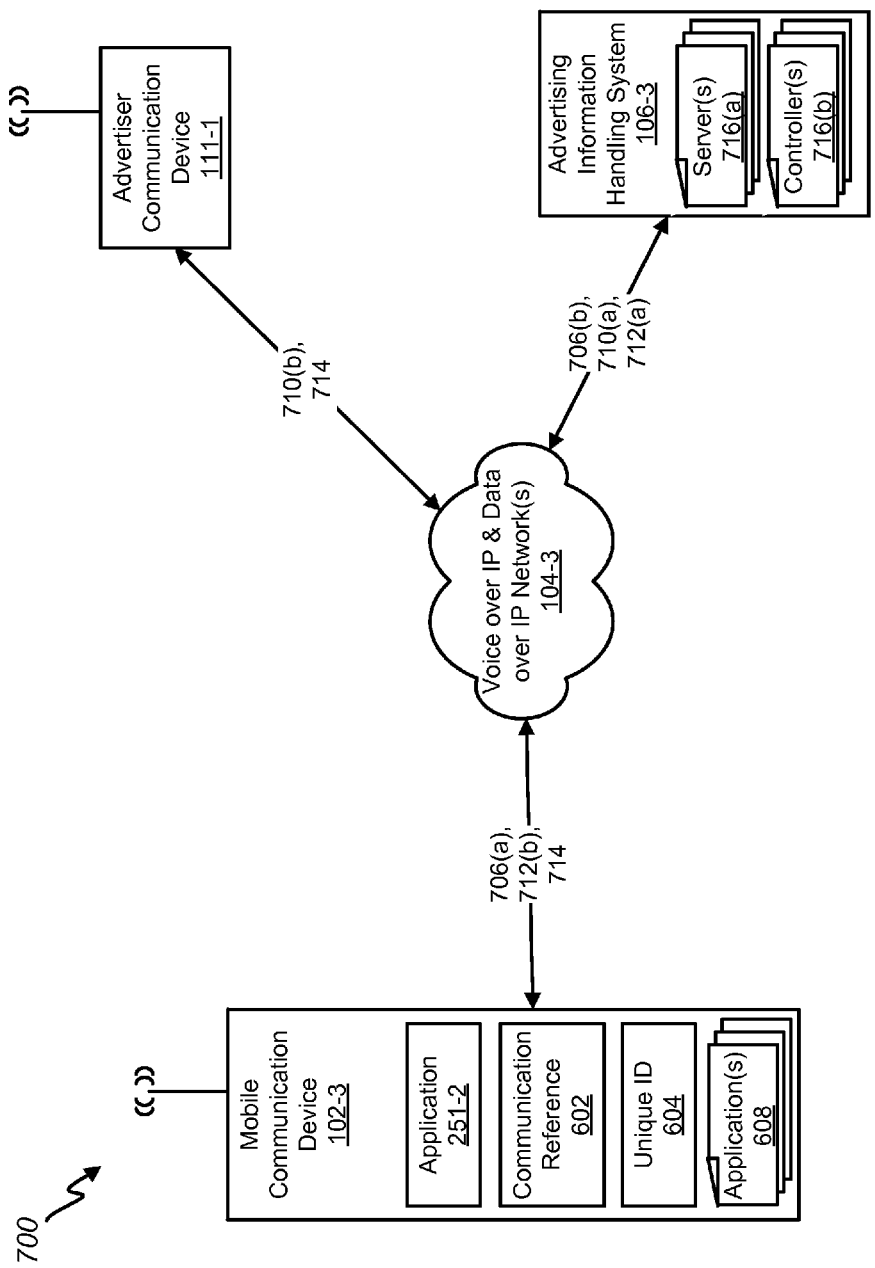
FIG. 7 depicts a high-level block diagram of a system, in accordance with certain embodiments of the present disclosure.

FIG. 7 depicts a high-level block diagram of a system 700, in accordance with certain embodiments of the present disclosure. The system 700 may correspond to certain embodiments of the system 100. According to certain embodiments, the system 700 may provide communications via the use the data network 104-3, and not through the PSTN 104-2 (as opposed to system 600 disclosed above, which utilized the PSTN 104-2). The communications may be facilitated through the application 251-2 and/or the advertising information handling system 106-3, as described further below.

In some embodiments, the advertising information handling system 106-3 receives, places, and/or routes telephone calls over packet switched networks. In some embodiments, the advertising information handling system 106 may provide packet-switched connections between callers and advertiser representatives, which correspond to the destinations of click-to-call requests. In some embodiments, the advertising information handling system 106 can place and/or receive direct VoIP calls to/from the callers/advertiser representatives. In some embodiments, the advertising information handling system 106 may use the data network 104-3 completely (along with one or more access points 105 via 3G/4G/Wi-Fi, e.g.), as opposed to through the PSTN 104-2, thereby excluding other carriers from handling the call. With the servers/switches of the advertising information handling system 106 routing calls via the data network 104-3, complete call tracking may be achieved without the need of a call tracking number. Accordingly, certain embodiments may allow for tracking of a great number of businesses, where the tracking not limited by a telephone number inventory.

In some embodiments, the mobile communication device 102-3 configured with the mobile application 251-2 may provide a softphone dedicated to the device that facilitates communications with advertiser representatives and the advertising information handling system 106, as well as call tracking, via the data network 104-3. In some embodiments, the mobile communication device 102-3 configured with the mobile application 251-2 may send provisioning information to the advertising information handling system 106-3 that may indicate communication reference information 602 and/or identification information 604, as discussed herein. The communication reference information 602 may be stored in the application 251-2 and/or the advertising information handling system 106-3. In some embodiments, communication reference information 602 could correspond to dedicated reference information for a softphone dedicated to the device.

In some embodiments, to make a voice connection responsive to a click-to-call selection by the user of the mobile communication device 102-3, one or more IP messages may be sent via one or more access points to one or more servers/switches of the advertising information handling system 106, as indicated by interfaces 706(*a*) and 706(*b*). The one or more IP messages may indicate the communication reference information 602, the identification information 604, and/or another identifier (which could be an authentication token/key, in some embodiments) from which phone number information of the mobile communication device 102-3 may be identified and/or determined.

The one or more IP messages could indicate the phone number information for an advertiser representative corresponding to the advertisement selected. Alternatively, an identifier of the advertiser representative and/or advertisement could be indicated, and the advertising information handling system 106 could determine the phone number information for the corresponding advertiser representative, e.g., based on information stored for the advertiser. In some embodiments, one or more SIP requests may be sent via one or more access points to one or more servers/switches of the advertising information handling system 106. By routing of the messaging to the advertising information handling system 106, other telecommunication carriers could be excluded.

In some embodiments, the advertising information handling system 106 can place separate VoIP calls over the IP network(s) 104-3 to the advertiser representative (710(*a*), (*b*)) and the caller (712(*a*), (*b*)), and then bridge the calls (714). Accordingly, each of the advertiser representative and the caller receives an inbound call (710(*a*), (*b*)) placed via the packet switched network 104-3, and the advertising information handling system 106 joins the separate calls. In some embodiments, the two calls are merged responsive to the each of the caller and the advertiser representative accepting the call.

In some embodiments, to make a voice connection responsive to a click-to-call selection by the user of the mobile communication device 102-3, the advertising information handling system 106 can route a VoIP call established with the caller over the IP network(s) 104-3 to the advertiser representative. Accordingly, only the advertiser representative receives an inbound call. For example without limitation, a SIP request from the mobile communication device 102-3 could be reconfigured and redirected based at least in part on the phone number of the advertiser representative. A SIP request could be configured so that response messaging is routed to the mobile communication device 102-3 and/or the advertising information handling system 106. In some embodiments, the call from the caller is connected to the advertiser representative responsive to the advertiser representative accepting the call.

In various embodiments, the advertising information handling system 106 may interface with the caller and/or the advertiser representative using one or more suitable types of internet telephony systems, such as, for example, SIP-based internet telephony, H.323-based internet telephony, and/or the like. Accordingly, various embodiments of the advertising information handling system 106 may support multiple, different types of internet telephony systems. In some embodiments, the advertising information handling system 106 may include one or more servers 716(*a*) and one or more controllers 716(*b*), which may be SIP servers and session border controllers, in order to interface with the IP network(s) 104-3, control messaging, and facilitate set-up, voice conversation, and tear-down of VoIP calls to or from the advertising information handling system 106. The one or more controllers 716(*b*) could handle processing and routing of incoming requests from the mobile communication device 102-3.

In various embodiments, the mobile application 251-2 and/or the advertising information handling system 106 track information about calls, which information may include any suitable about particular advertisements, as discussed herein. For example without limitation, the mobile application 251-2 and/or the advertising information handling system 106 may be configured to track information relating to advertisements and calls to facilitate the gathering, processing, evaluating, and presenting of information for an advertiser interface, as discussed further below. In some embodiments, certain features discussed with reference to mobile communication device 102-3 could likewise apply to the advertiser communication device 111-1, which could have installed thereon an application 251 to facilitate the features.

Figure 8:
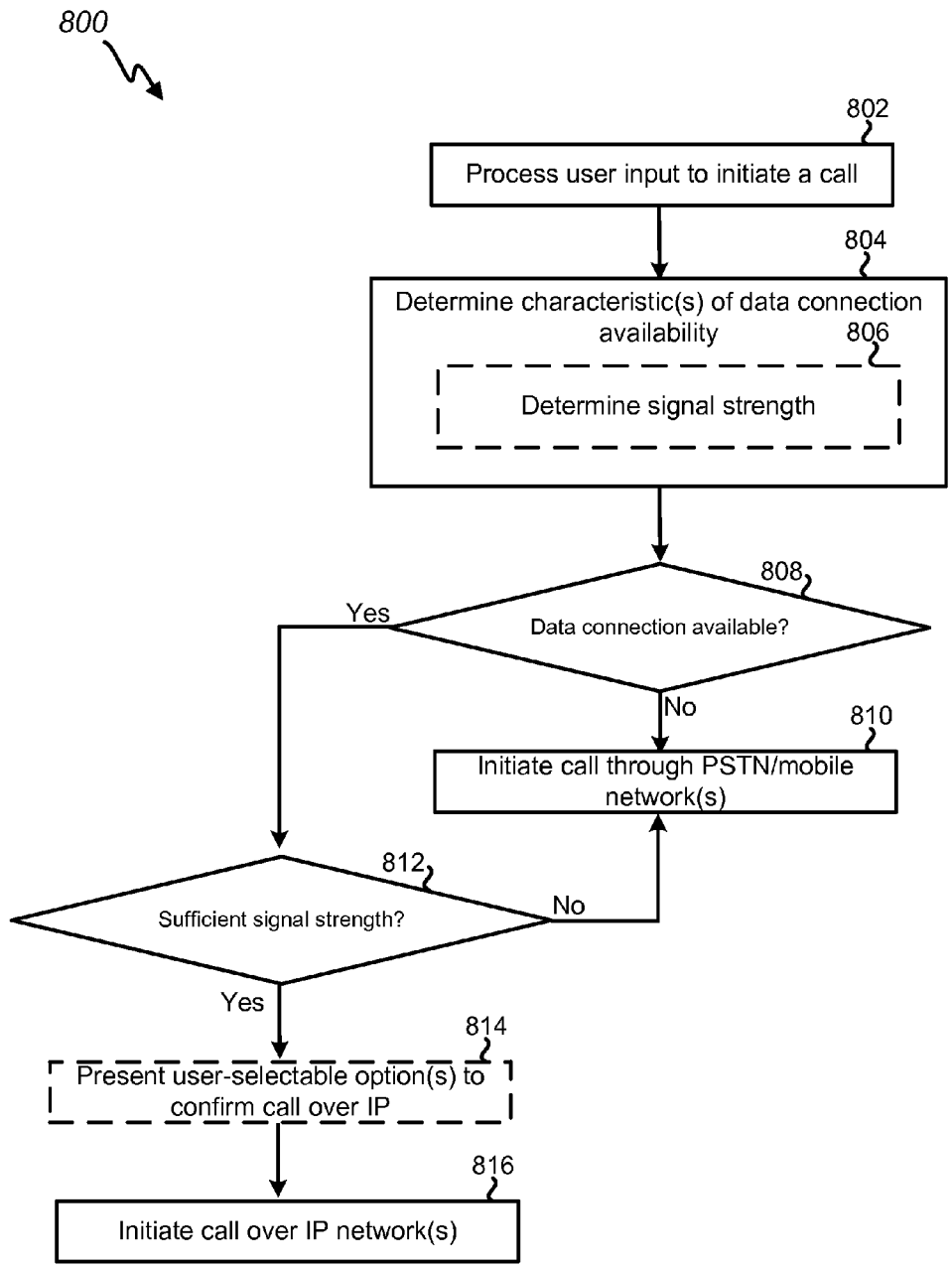
FIG. 8 illustrates an example method of facilitating a communication session with an advertiser responsive to user selection of an option to call the advertiser, in accordance with certain embodiments of the present disclosure.

FIG. 8 illustrates an example method 800 of facilitating a communication session with an advertiser responsive to user selection of an option to call the advertiser, in accordance with certain embodiments of the present disclosure. Teachings of the present disclosure may be implemented in a variety of configurations that may correspond to the systems disclosed herein. As such, certain steps of the method 800, and the other methods disclosed herein, may be omitted, and the order of the steps may be shuffled in any suitable manner and may depend on the implementation chosen. Moreover, while the following steps of the method 800, and those of the other methods disclosed herein, may be separated for the sake of description, it should be understood that certain steps may be performed simultaneously or substantially simultaneously.

Some embodiments provide the options of contacting an advertiser through the PSTN 104-2 and/or mobile network(s) 104-4 or through the IP network(s) 104-3. In some embodiments, the means of linking to the advertiser whether through the PSTN 104-2 and/or mobile network(s) 104-4 or through the IP network(s) 104-3 may be contingent upon the data connection available to the communication device 102-3.

According to one embodiment, the method 800 may begin as indicated by block 802. As indicated by block 802, user input to initiate a call may be processed. For example, the user may select a click-to-call option presented with an advertisement. In some embodiments, the application 251-2 may issue an interrupt to halt a process of the communication device to proceed with a call via a phone application of the communication device 102-3 responsive to the user selection.

As indicated by block 804, one or more characteristics of data connection availability may be determined. For example, the application 251-2 may determine whether the communication device 102 is connected to a Wi-Fi network, a 3G network, a 4G network, and/or the like. The application 251-2 may transmit indications of a connection to the advertising information handling system 106.

As indicated by block 806, in some embodiments, the signal strength of the connection to such a network may be determined, if any such connection exists. Any of such characteristics may be indicated to the backend system 106. As indicated by block 808, it may be determined whether any such connection exists. If no connection exists, the call may be made via the PSTN 104-2 and/or mobile network(s) 104-4. As indicated by block 810, the application 251-2 may prompt the initiation of the call with a phone application of the communication device 102-3. In some embodiments, the application 251-2 may allow a previously interrupted process of the communication device to proceed with a call via the phone application of the communication device 102-3.

However, if it is determined that a data connection is available to the mobile communication device 102-3, in some embodiments, may be determined whether there is sufficient signal strength for the connection, as indicated by block 812. In some embodiments, a connection to such a network may be deemed as sufficient for considering the option of initiating a communication session with an advertiser via the data connection via through the IP network(s) 104-3 as being available. In some embodiments, the signal strength must satisfy a threshold in order for a communication session over the data network to be considered available. Any suitable threshold may be employed in various embodiments. With some embodiments, the determination of whether the data connection has sufficient signal strength may be determined in the application 251-2; some embodiments, the determination may be made by the backend system 106 based on information transmitted from the mobile communication device 102-3.

If it is determined that a data connection with sufficient signal strength is not available to the mobile communication device 102-3, the call may be made via the PSTN 104-2 and/or mobile network(s) 104-4. However, consequent to determining that a sufficient data connection is available to the mobile communication device, some embodiments may present a user-selectable option for the user to choose whether to use an IP connection or use the public switched telephony network, as indicated by block 814. A user-selectable option may also be presented via the application for the user to always use the IP connection when available. Thereafter, the IP network may be automatically selected, when available, as the means to medication to advertisers without prompting the user for confirmation. However, some embodiments may automatically choose that means for initiating a communication session over IP network(s) 104-3. In either case, a call may be initiated over IP network(s) 104-3, as indicated by block 816.

Figure 9:
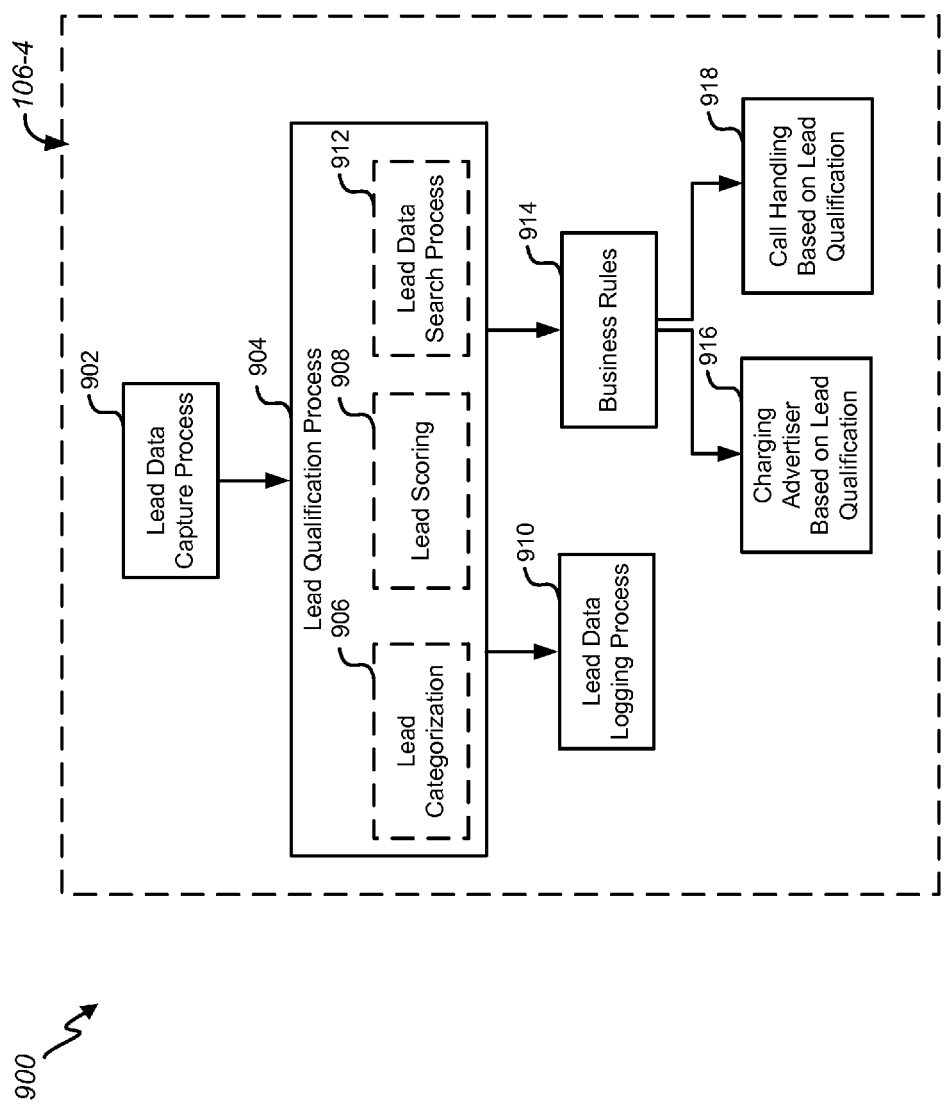
FIG. 9 depicts a functional block diagram of certain aspects of lead qualification to qualify callers based at least in part on call information captured, in accordance with certain embodiments of the present disclosure.

FIG. 9 depicts a functional block diagram of certain aspects of lead qualification 900 to qualify callers based at least in part on call information captured, in accordance with certain embodiments of the present disclosure. Various embodiments may employ any one or combination of various methods of qualifying leads. In some embodiments, a caller may be simply identified as a lead or not. To give an example, if somebody calls a plumber, and the plumber just says wrong number, the caller/callee may typically hang up in a relatively short time period, say, 9 seconds or some other short time period. Such a call is not a lead. Therefore, the plumber should not be charged for such a call according to some embodiments. As another possible scenario out of many, if there were, say, 20 calls to a particular service provider phone number, certain embodiments could determine that, out of the 20 calls that were provided to the service provider, only 14 were leads. Thus, the service provider may be charged only for those 14 calls according to some embodiments.

Though service, service provider, service provider categories, and/or the like are referenced herein as bases for features of embodiments herein, it is to be understood that one or more other bases could be used in addition or in alternative. For example, product, property, business, corresponding providers, corresponding categories, and/or the like could be a basis for features in addition or in alternative to service. Thus, references herein to service, service provider, service provider categories, and/or the like are not to be construed as necessarily limiting embodiments to those aspects. Furthermore, in certain embodiments, any one or combination of advertiser, service representative, business, publisher, product provider, property provider, and/or the like may be the same entity.

Captured data may be used to identify calls with quality leads. Lead data (which may include one or more items of information variously referenced herein as call information) may include any suitable information that may be captured to indicate, infer, and/or determine which callers are likely to bring in business (i.e., likely to conduct business, enter into a transaction, etc.). A call can be broken down and assessed based on any one or combination of various factors, such as, for example, duration of the call, distance of the caller from the business associated with the callee, demographic information of the caller, a call recording, a transcription of the call, a keyword analysis, and/or the like. Based on such indicia, a lead can be identified/qualified.

Certain embodiments may employ communication references 134 that can be used as call tracking numbers, as discussed herein. Based in part on the call tracking number received by the system, monitoring of the call may be performed. However, as discussed herein, certain embodiments may obviate the need for call tracking numbers. Certain embodiments may use a client application 251 installed on the mobile computing device 102 to facilitate data capture. In some embodiments, the client application 251 may qualify captured data in part or in whole and/or send captured data to the advertising information handling system 106 for qualification. As discussed herein, certain embodiments may route calls and/or provide communication connections, which may facilitate data capture. In various embodiments, calls may be recorded, monitored, selectively/partially sampled, and/or the like via the client application 251 and/or the information handling system 106 on the backend.

The advertising information handling system 106-4, which may be or include an advertising platform, may be configured to qualify leads. In some embodiments, the processes for qualifying leads may be performed in whole or in part by the advertising information handling system 106-4. Though certain aspects of lead qualification 900 are depicted as being performed by the advertising information handling system 106-4, the processes for qualifying leads may be performed in whole or in part by a client application 251 installed on the end-user communication device 102 and/or the advertiser communication device 111 in some embodiments. In some embodiments, a client application 251 installed on the mobile communication device 102 and/or 111 may facilitate a lead data capture process 902. The lead data capture process 902 may include any one or combination of various embodiments as discussed herein that track information. The advertising information handling system 106-4 may receive and process data regarding an end-user in implementing the lead data capture process 902.

Having lead data, the advertising information handling system 106-4 may implement a lead qualification process 904. Some embodiments may qualify a lead according to a graduated lead scale. Any suitable lead scale may be used in various embodiments. In some embodiments, a lead scale could entail a categorization scheme 906, with categories such as good lead, neutral, and non-lead, or any suitable categories. In some embodiments, a lead scale could entail a lead scoring system 908. The lead scoring system 908 could be correlated to the category scheme in some embodiments, such that certain scores correspond to certain categories. Some embodiments may score a lead with a numerical expression, for example, a lead score. For example, in some embodiments, a caller calling a representative of a service provider may be evaluated for lead potential. A lead score may be an assessment of a caller's potential to be a good lead. Accordingly, a lead score may indicate which callers are more likely than others to bring in business, thus providing a quantitative estimate of the probability that a given caller will provide business. By way of example without limitation, a lead scale could include a range of lead scores from 0 to 100, or from 0 to 1,000, with the high end of the scale indicating greater probability. Some embodiments may use methods of statistical analysis to derive a lead score. Various embodiments may determine a lead score based on any one or more suitable quantifiers.

In some embodiments, the advertising information handling system 106-4 may implement a lead data logging process 910. Lead information about a caller may be retained as a lead profile. A lead profile may include indication of the corresponding caller as having a record qualified according to a lead scale. The lead qualification process 904 could take into account previously logged lead data about a caller. Thus, the advertising information handling system 106-4 may implement a lead data search process 912. Accordingly, certain embodiments may provide for reliable identity matching and lead qualifying in view of historical data about callers.

In some embodiments, the advertising information handling system 106-2 may implement business rules 914 to take action based at least in part on the lead qualification. An advertiser could be charged based on the lead qualification 916 in some embodiments. The account management/billing module(s) 146(*e*) could implement a code system by which an advertiser is charged based on the lead qualification. For example, an advertiser could be charged only for good leads and/or not charged for bad leads. The charging process could be a performance-based system where charges are accrued on a per-call basis.

In some embodiments, the charges could be based on lead score. Charges could be proportional to lead score in some embodiments. Charges could be applied contingent on one or more thresholds. For example, a minimum threshold could be employed, where a lead score not meeting the minimum threshold could result in no charge. A lead score above the minimum threshold could result in a charge. The charge could be based on one or more score bands, for example, one or more score bands above the minimum threshold. By way of example, a lead score above a 50% minimum threshold could be correlated to quartile bands. A discounted charge could be applied to a call will be a lead score correlated to a 50-75% band. A full charge could be applied to a call will be a lead score correlated to the 75-100% band. Some embodiments could implement a proportional charge, such as a lead score correlated to 75% could result in a charge of 75% (or some other proportion) of the full charge.

In some embodiments, the advertising information handling system 106-4 may handle calls based on lead qualification 918. Lead qualification may allow the delivery a good leads to those advertisers willing to pay for them. Thus, certain embodiments may route calls according to both lead qualification of the calls and correlation to advertisers able to provide service to callers.

Figure 10:
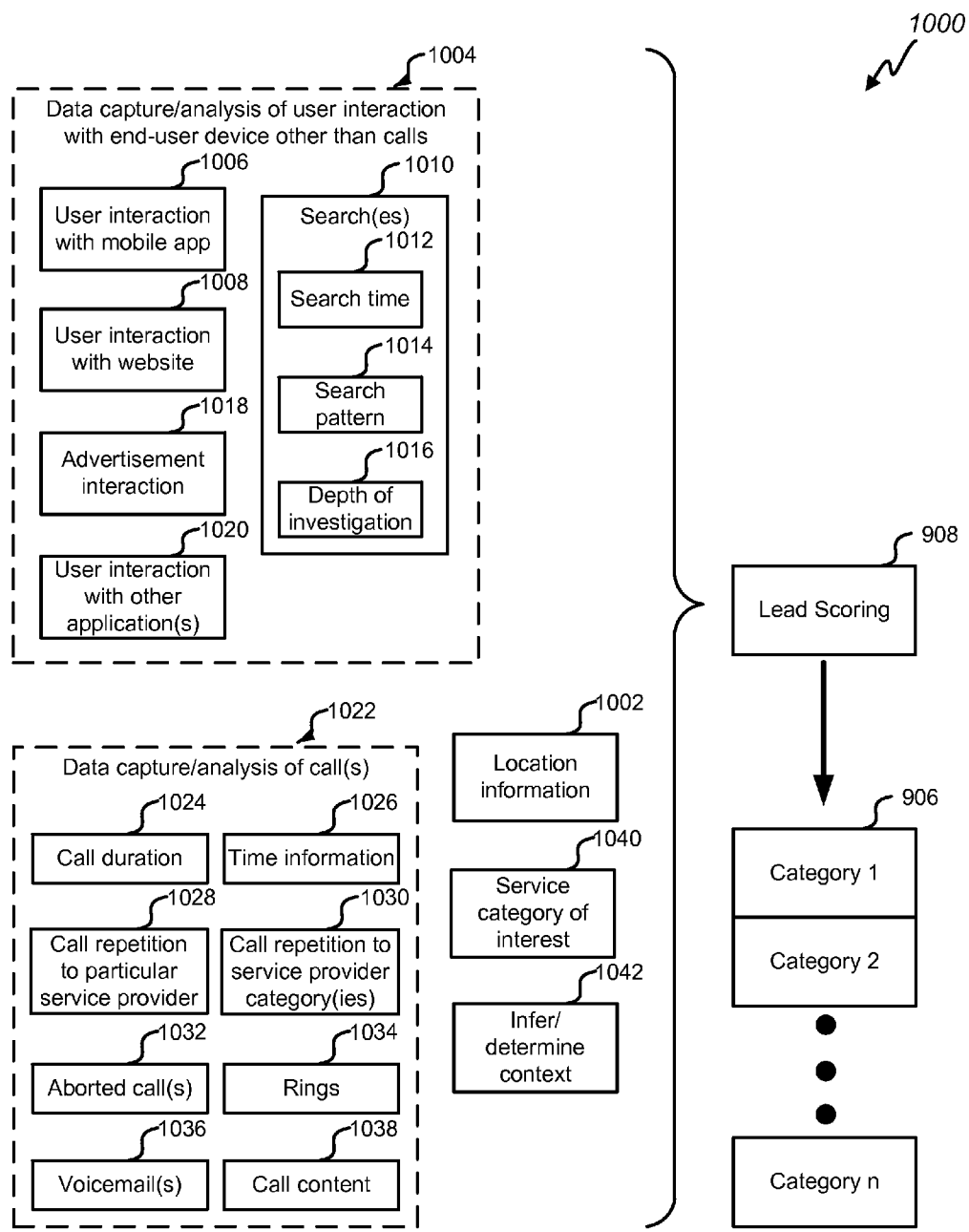
FIG. 10 depicts a functional block diagram of certain aspects of lead data capture and lead qualification, which may correspond to certain aspects of the lead data capture process and the lead qualification process, in accordance with certain embodiments of the present disclosure

FIG. 10 depicts a functional block diagram of certain aspects of lead data capture and lead qualification 1000, which may correspond to certain aspects of the lead data capture process 902 and the lead qualification process 904, in accordance with certain embodiments of the present disclosure. The criteria for qualifying leads may include, for example, whether a given call involved: a human as opposed to a robocall; a caller dialing the wrong number; a caller with a record of being a well-qualified lead; a landline or a cellphone; proximity; and/or a particular area code. The leads may also be weighted as a result of keywords being used in a conversation or recording—e.g., the keywords may indicate a caller ready to buy. The qualification may take into account what a caller wanted on a previous call or how much they interact with a website. Interaction of the caller with other advertisers could increase the ranking especially if they purchased from others.

Some embodiments may employ a decision tree, checklist, workflow, and/or the like to capture various aspects of lead data and assess those aspects to infer lead qualification. Such a decision tree, checklist, and/or workflow may incorporate any one or combination of the depicted aspects and/or similar aspects in any desired order, according to various embodiments. Lead data can be consolidated and processed to yield a lead score 908. Any one or combination of types of lead data may be captured and qualified. By way of example, if a caller from a radius of five miles of a plumber calls the plumber, and talks to the plumber for 120 seconds, and, in those 120 seconds, keywords weighted as strong indicia of a good lead for a plumber are detected multiple times, the call may be scored with a high lead score that indicates that a high likelihood that it is good lead. And the plumber may be charged accordingly.

As indicated by block 1002, in some embodiments, location information may be captured to provide an indication of the end-user's location. As discussed herein, various embodiments may employ any one or combination of methods of capturing location information, including but not limited to, gathering location information via any one or combination of the communication device 102, 111, such as the device GPS capabilities, access points, third parties, determining the area code associated with the device, differentiating between whether a caller uses a landline or wireless network, receiving explicit location information with one or more search requests, inferring location information from one or more search requests, identifying a caller/user profile that includes location information and is associated with an end-user, and/or the like. Gathering of location information may be facilitated by the application 251 of the end-user device sending tracking information to the advertising information handling system 106. In some embodiments, gathering of location information may be performed before an end-user places a call, for example, via the mobile application. In addition or in the alternative, gathering of location information may be performed concurrent with a call and/or after a call. Various location quantifiers could be assigned to a user based on the service provider of interest. For example, with some service providers, proximate location of a callee is important, say, for a plumber for example. With other service providers, proximate location of a callee may not be so important. As an example, a number of points could be assigned to the caller based on an identification of the importance of proximity to the service provider/category of interest and the location information gathered for the caller.

In some embodiments, as indicated by block 1004, an end-user's interaction on the mobile communication device may be captured as lead data of interest. For example, as indicated by blocks 1006 and 1008, in some embodiments, end-user interaction with the mobile application 251 and/or website provided by the system may be captured. As indicated by block 1010, the user interaction may involve one or more searches. A user, for example, may spend significant time searching for a service provider prior to making a call. Say the user spends 10 minutes searching for a plumber in a certain geographic area, say Glendale, Calif., before making a call to a particular plumber.

As indicated by block 1012, the amount of time may be taken into account as an indicator of relatively greater interest. The time spent searching a particular category of service providers could be correlated to an increased indicator of interest in any suitable manner. Merely by way of example, a number of points could be assigned to a user based on the time spent searching. Various interest quantifiers could be assigned to a user based on search time in a proportionate manner. For example, a number of points could be assigned for every minute of search time. Various interest quantifiers could be assigned to a user based on the user meeting any one or combination of various thresholds of search time. As an example, a number of points could be assigned after the user accrues 5 minutes of search time.

As indicated by block 1014, in some embodiments, a search pattern may be taken into account as lead data of interest. The search focus or non-focus may be considered. Certain embodiments could differentiate between searches to detect a pattern of searches corresponding to a given category of searches. For example, a user might spend 5 minutes of searching, viewing results, linking to provider websites, reading reviews, etc., all related to a particular category of service providers, say plumbers in a particular geographic area. Such search time could be distinguished from non-focused searching, such as searching related to various categories, which might not be related. In such cases, no additional points or lower number points may be assigned.

As indicated by block 1016, in some embodiments, a depth of investigation may be taken into account as lead data of interest. Stated otherwise, the depth of searching may be taken as an increased level of interest. For example, a user that seems to scrutinize service provider reviews may be assigned a greater number of points than a user who does not. Scrutiny of reviews could be assessed by not only accessing review information, but also time spent viewing review information and/or the user selecting one or more options indicating that one or more service provider reviews were helpful, where such user selectable options are available (e.g., "yes"/"no" options selected in answer to the presented question of "Was this review helpful?").

As indicated by block 1018, in some embodiments, end-user interaction with advertisements may be taken into account as lead data of interest. A user's interaction with one or more other advertisers could be captured as the mobile application 251 may be configured to gather tracking information about a user's interaction with advertisements are presented to a user via the mobile application 251 and/or other applications 608 of the mobile communication device 102, as indicated by block 1020. In some embodiments, the mobile application receives, pulls, extracts, and/or listens to information from one or more other applications of the mobile communication device 102 to gather tracking information. Advertisements may be presented via the one or more other applications 608 and/or calls are placed or at least initiated via the one or more other applications 608.

Some embodiments may capture previous indications of pertinent interests by callers which may be related to interacting with advertisements, shopping, and/or browsing. For example, certain purchases made by a caller with the mobile communication device may be relevant to certain service provider categories. As one possible example, a user may purchase a new showerhead or lavatory online, which purchases could be correlated to a service provider category of, say, plumbing, home remodeling/repair, handymen, and/or the like. As another possible example, a user could be browsing offerings of such products, and such browsing could likewise be associated with an indication of interest. Any one or combination of the foregoing bases could be used to increase a lead score 908.

As indicated by block 1022, in some embodiments, the user interaction may involve one or more calls. Any one or combination of the aspects of the call(s) could be bases on which to adjust a lead score 908. In some embodiments, the client application 251 may be configured to monitor calls placed with the mobile communication device 102 and/or other calls aspects associated with the mobile communication device 102 and/or 111. A user's interaction with other advertisers and/or service providers may be captured to derive pertinent call data. In some embodiments, tracking information may include call information gathered from a phone application of the mobile communication device 102. Tracking information may be gathered from an advertisement and/or the phone number called to indicate subject matter and/or service provider corresponding to the advertisement.

As indicated by block 1024, in some embodiments, call duration may be taken into account as lead data of interest. The varying duration of calls could also be correlated to varying levels of interest, with longer calls indicating greater interest. As indicated by block 1026, in some embodiments, time information may be taken into account as lead data of interest. For example, the time when one or more calls are made could be correlated to business hours, prime time, low demand time, and/or off hours of a given business, and the lead score could be adjusted accordingly. One or more calls are made during the pertinent business hours, prime time, and/or low demand time could result in a higher score 908. Conversely, one or more calls are made during the pertinent off hours of a given business could result in a discounted increase in points, no increase, or a decrease in points.

As indicated by blocks 1028 and 1030, in some embodiments, call repetition may be captured as lead data of interest that may be indicia of a lead. Certain numbers might be associated with people that use service providers with greater relative frequency. For example, some people, say those in the apartment business, may call plumbers often. Calls repeated to/from a particular service provider (1028) could be an indication of interest in the service provider and/or a corresponding service provider category. For example, if a single phone is calling the same plumber four times in a day, that may correspond to a good lead. So, the plumber may be charged for one or more of the calls.

Calls repeated to/from multiple service providers could be an indication of interest, particularly if the multiple service providers correspond to a common service provider category (1030). If a caller called multiple plumbers that could be strong indicia of a good lead, particularly if keywords matched between calls, such as keywords indicating a service need, "broken pipe," for example.

As indicated by block 1032, in some embodiments, call intelligence data could include information captured about one or more aborted calls by the caller. Information about numbers of aborted calls could be considered indicative a less qualified lead. Accordingly, a caller with a history of aborting calls, as reflected by the caller's profile could be taken into account with a discounting of lead quantifier information for the caller. By way example, a number of points could be deducted from the lead score.

As indicated by block 1034, some embodiments, analyzing further, may capture not only instances of aborted calls, but also the numbers of rings till the caller aborts. Such information could be used to qualify aborted calls. A high number of rings could be associated with a non-receptive callee, or one that is slow to pick up. In such a case, the aborted call may not count against the caller's lead score. Any threshold, such as three rings, for example, could be used to differentiate the cases of a caller apt to abort and a callee difficult to reach, with a number of rings meeting and/or exceeding the threshold shifting the accountability from the caller to the callee.

In some cases, a service provider may not pick up on a call from a caller that has been determined to be a well-qualified lead. In such cases, if a certain threshold of rings has been met, say 8 rings, the service provider could still be charged for call in some embodiments. The numbers of rings could also be used as data of interest for advertising metrics. Such data may also be tracked with respect to particular callees so that a service provider's record of answering calls is formed. Of interest to service providers may be the numbers of rings till the caller aborts and/or till the call is answered.

As indicated by block 1036, in some embodiments, if the call goes to voicemail, that fact can be captured. In some embodiments, voicemail may be recorded. The fact that a caller leaves a voicemail message rather than simply hanging up could be indicative of caller interest and could be correlated to the lead score with the addition of points, the caller that leaves a voicemail message being considered as having greater potential to be a lead then a caller who does not leave a message. As indicated by block 1038, in some embodiments, calls could be differentiated based on the content of calls, as discussed herein.

As indicated by block 1040, in some embodiments, a service category of interest may be inferred based on various data captured. In some embodiments, the information handling system 106 can look up the service provider associated with the phone number called. In some embodiments, having identified the service provider, the system 106 may determine the corresponding search category. For example, a user could make one or more calls to service providers corresponding to a particular category, say plumbers, in a particular area, say Glendale, Calif. The one or more calls could be taken into account as an indicator of relatively greater interest. Merely by way of example, a number of points could be assigned to a user based on the one or more calls. In some embodiments, interest quantifiers could be assigned to a user based on each call, say a number of points per call. The number of points could be the same or different for each call. For example, as the number of calls increases, the number of points assigned could be increased. Thus, the user's persistence could translate to a greater level of interest.

As indicated by block 1042, in some embodiments, context of the caller may be inferred/determined. Such context as information about the area of a caller, demographic data about the area/caller, history for a particular area, history for particular callers, and/or the like. The context information could be correlated to a service provider category to gauge relevance of the context information to the service provider category, and to adjust the lead score 908 accordingly. For example, a combination of certain keywords identified in the content 1038 and demographics may be indicia of a lead. As another example, certain area distinctions may be indicia of a good lead. For example, a certain area of town could be known to generally have a lot of plumbing issues. Say a plumber receives a call from the area, the knowledge of the area correlated to the service provider business could indicate that the call is likely to be a good lead. Information about various areas could be gathered by the advertising information handling system, for example, by analysis of call data, crawling for information, feedback from service providers, from third party providers, and/or the like.

Figure 11:
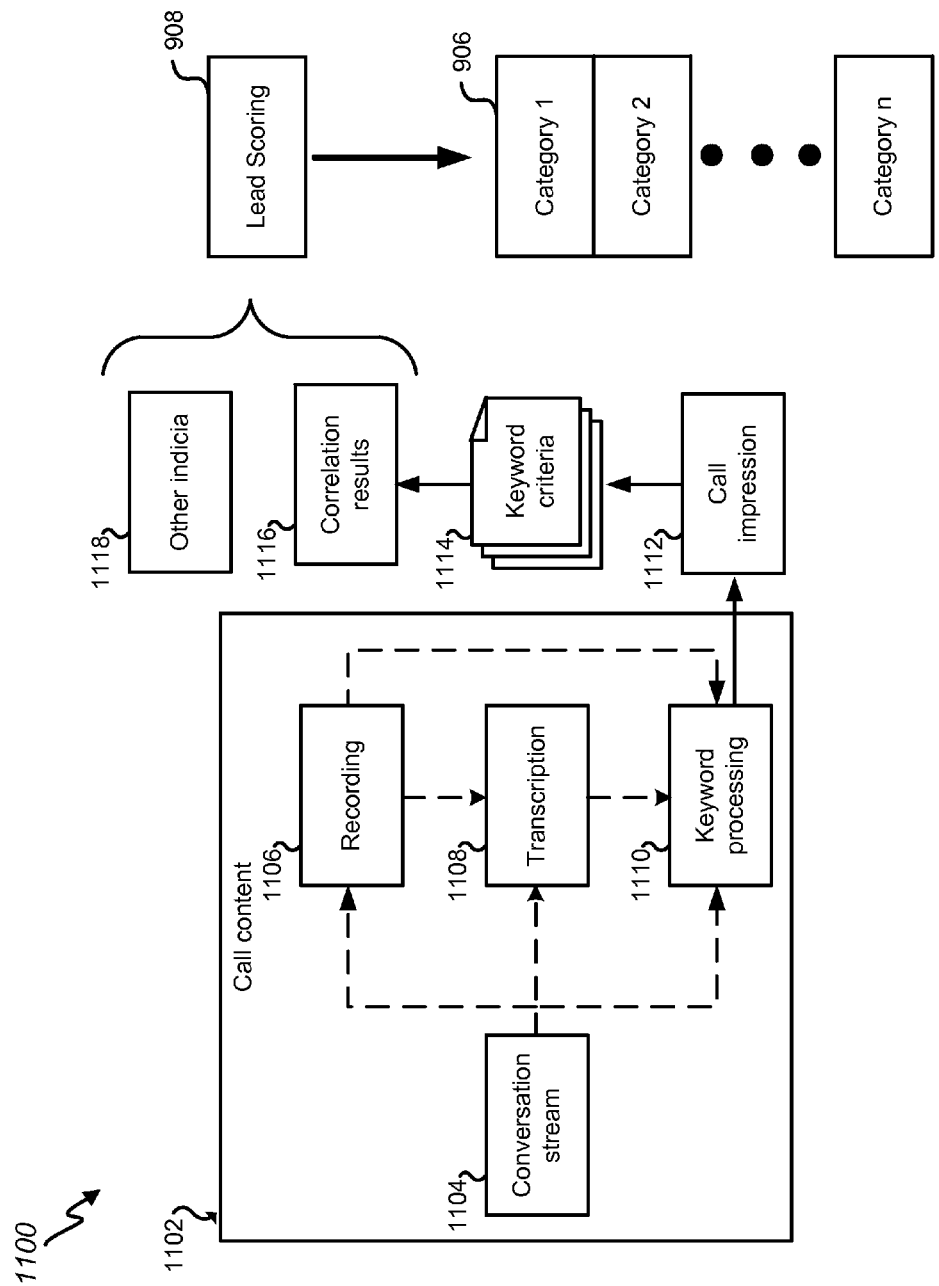
FIG. 11 depicts a functional block diagram of certain aspects of content-based lead data capture and lead qualification, in accordance with certain embodiments of the present disclosure.

FIG. 11 depicts a functional block diagram of certain aspects of content-based lead data capture and lead qualification 1100, in accordance with certain embodiments of the present disclosure. Call content 1102 may be captured by the application(s) 251 of the mobile communication device 112 and/or 111, and/or by the advertising information handling system 106. In some embodiments, the application 251 of the mobile communication device 112 and/or 111 may process call content 1102 to a certain extent and convey the processed content to the advertising information handling system 106 for further processing.

In some embodiments, the communication device 112 and/or 111 provides a conversation stream 1104. The conversation stream 1104 could be provided to the system 106 for further processing. Certain embodiments may use recordings 1106 of calls to determine if calls are leads or not. Calls can be recorded 1106 on the mobile communication device 112 and/or 111 in some embodiments. In other embodiments, calls can be recorded 1106 on the backend system 106, particularly in embodiments where calls are proxied through the advertising information handling system 106.

Certain embodiments may provide for transcription 1108 of calls. Calls could be transcribed 1108 by the client application 251 or by the backend system 106 either of which may be configured to record calls. A transcription engine, which could be included in the engine(s) 146, could process recordings of calls. In some embodiments, transcriptions 1108 could be based on recordings 1106; in other embodiments, the conversation stream 1104 could be processed directly to generate transcriptions 1108.

Certain embodiments may provide for keyword processing 1110 of calls. In some embodiments, a call impression engine, which could be included in the engine(s) 146, could process transcriptions 1108 for keyword identification 1108. However, in some embodiments, rather than transcribing calls verbatim, a call impression engine could process keywords directly from a conversation stream 1104 or from a recording 1106. The call impression engine could be configured to recognize communication content/form that is evidence of lead potential. Certain keywords may be indicia of a lead. Lead scores 908 of calls may be based at least in part on keywords used in the calls.

The impression engine may identify keywords as distinctive markings and could compile the keywords as a call impression 1112 for the purposes of characterizing the call from the perspective of lead potential. The call impression 1112 could be retained in any suitable form, such as a file, a list, etc. The keywords could be correlated with keyword criteria 1114 to characterize the call from the perspective of lead potential and generate correlation results 1116 that can be taken into account with lead scoring 908. In some embodiments, the correlation results 1116 can be taken into account in conjunction with other indicia 1118, which could correspond to any one or combination of the other indicia of lead potential discussed herein and/or the like.

Certain embodiments may provide for a privacy overlay to maintain a barrier between captured content of calls and humans. Some embodiments could provide for privacy mechanisms such as, for example, machine review of calls only. Recordings 1106 of calls may not be returned to a human in some embodiments. In some embodiments, recordings 1106 of calls may be processed such that the recordings 1106 are not human-readable. For example, in some embodiments, recorded call content 1106 could be randomized such the recordings 1106 are not human-readable.

Some embodiments could retain only select keywords 1112. The retained keywords 1112 could correspond to distinctive indicia that provides evidence of lead potential. In some embodiments, call analytics could be performed in real time such that recordings 1106 are not necessary and voice recognition would suffice to capture keywords. Thus, the keywords could be retained as metrics for a call. In some embodiments, the keywords 1112 could be selected such that the call could not be reconstructed based on the keywords 1112. In some embodiments, where keyword processing 1112 is based on transcription 1108, transcriptions 1108 could be scrubbed after keyword capture such that only the keywords 1112 are retained. In some embodiments, the recordings 1108 may be archived for a predetermined period of time. Accordingly, certain embodiments may obviate the need for any announcement that typically indicates that a call may be recorded for quality reasons or for training purposes or the like.

Figure 12:
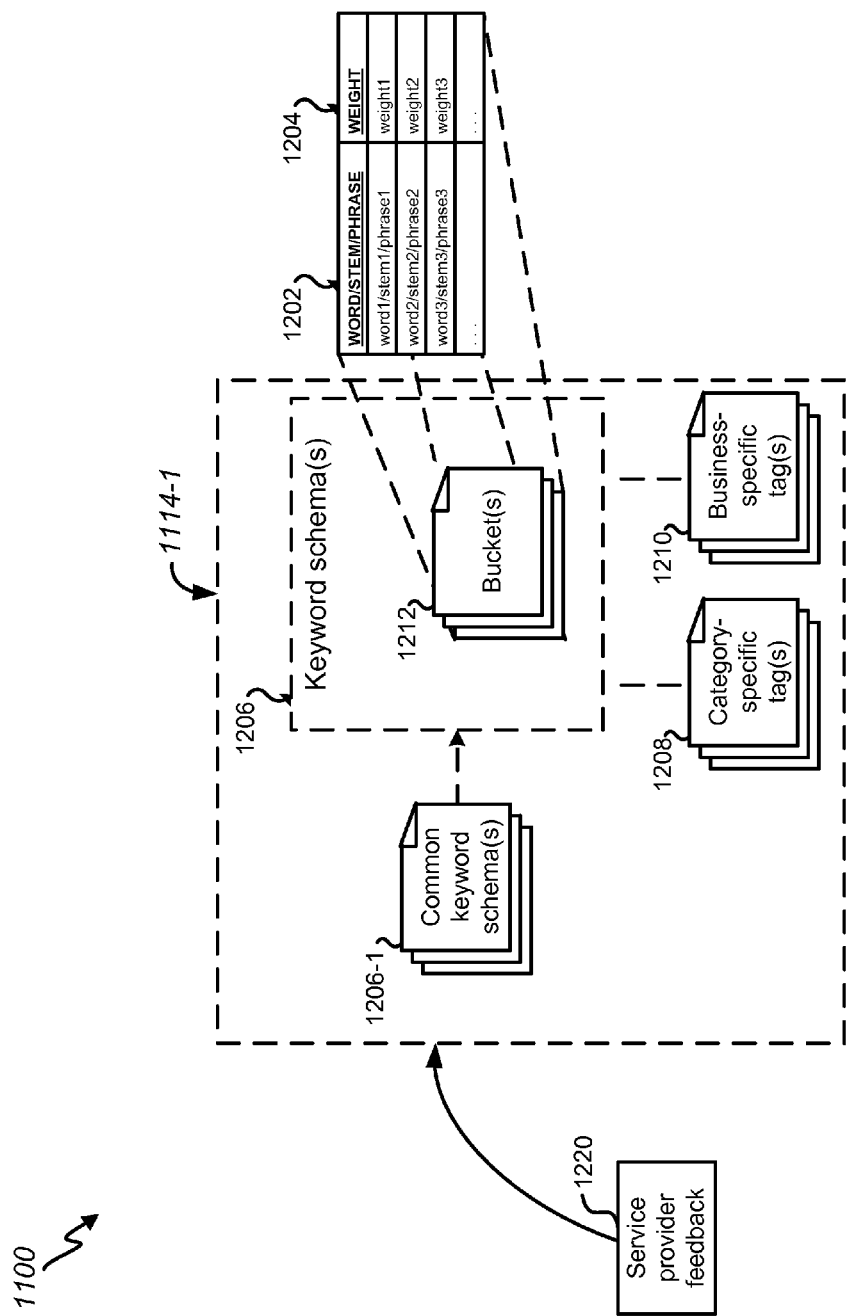
FIG. 12 depicts a functional block diagram of certain aspects of content-based lead data capture and lead qualification, in accordance with certain embodiments of the present disclosure.

FIG. 12 depicts a functional block diagram of certain aspects of content-based lead data capture and lead qualification 1100, in accordance with certain embodiments of the present disclosure. The keyword criteria 1114-1 could include keywords identified by any one or combination of words, word stems, phrase, word groupings, and/or like keyword information 1202. The keyword criteria 1114 could include weighting 1204 assigned to words, word stems, phrase, word groupings, and/or the like. For example, a keyword 1202 could be assigned a weight 1204 according to its significance. Increased word weights 1204 could be tied to increasing probability that the caller is a good lead. Keyword repetition during a call could be recognized and could increase the lead score, with certain keyword repetition being tied to increasing probability that the caller is a good lead.

The keyword criteria 1114-1 could correspond to one or more keyword schemas 1206 that are correlated to various call scenarios. Thus, in some embodiments, keywords of a call impression 1112 could be matched with a keyword schema(s) 1206. Various keyword schema(s) 1206 could be correlated to various call scenarios. For example, some embodiments may provide for wrong number detection. The keywords "wrong number" may well indicate that a caller called the wrong number. Such evidence could be coupled with other indicia 1118 further corroborating the evidence that the call was made to the wrong number. A relatively short call duration, for example, could be such corroborating evidence and such a call may be considered to have a high likelihood of being a non-lead.

Some keywords may mean a buying call in one context but not in another. Different keyword schemas 1206 could be tailored to different contexts. Accordingly, certain embodiments may provide for contextual discrimination so that keywords are accurately correlated with a good lead in the proper context, but are not correlated with a good lead in another context. Keywords could be categorized by service provider category into category-specific keyword lexicons. Keywords could be gathered for any sort of profession and grouped into a specific keyword schema 1206. For example, if somebody is calling a restaurant and just talks for a few seconds, considering the duration alone would not be an accurate indication of whether the call is a lead. However, if the caller asks, "Are you open," and the callee says, "Yes, we're open," such a call is a valid lead, although it was such a short call, because of the keyword indicia. Similarly, keywords associated with asking for directions, making a reservation, etc., could be strong indicia of good leads for a restaurant business. Category-specific tags 1208 or any other suitable means of linking could be used to associate category-specific keyword schemas 1206 to specific categories. For example, each business could be tagged and tied, for example, via code system to a business-category-specific schema 1206. Business-specific tags 1210 or any other suitable means of linking could be used to associate business-specific keyword schemas 1206 to specific categories. For example, each business could be tagged and linked, for example, via code system to a business-specific schema 1206.

In some embodiments, a keyword schema 1206 could include word buckets/sets 1212 of good words, bad words, and/or neutral words, that is, keyword information indicative of a lead, keywords indicative of a non-lead, and/or keyword that are not useful as indicia. The word buckets 1212 could be tailored to each category and/or business. In some embodiments, each category may have three word sets 1212 associated therewith, one for good words, bad words, and/or neutral words. Other embodiments may simply have a good word set, or a good word set and another word set.

Within each word bucket 1212, various words could be assigned various weights according to their significance. Such word buckets 1212 could be implemented in any suitable manner, including word lists, word tables, matrices, and/or the like. And within a bucket 1212, keywords could be organized in a rank order and/or any auditable hierarchical structure according to weight. Some embodiments may have keywords organized according to decision tree, with contingencies so that only certain combinations of keywords may be considered. For example, certain keywords could only have significance if used in conjunction with other keywords, and/or not in conjunction with others. Some contingencies could be implemented so that only a threshold cumulative weight and/or keywords need be identified to score the call. For example, the top five keywords having the greatest weight of all the keywords within a bucket may cumulatively meet or exceed a minimum threshold of cumulative weight so that further processing of keywords and/or the call need not be performed if hits for the top five keywords are found for the call.

Some words, however, may be common to multiple service provider categories/business, e.g., common keywords that may indicate a caller ready to buy or ready to come into a business location, wrong number detection, etc. Some embodiments may enforce common keyword schema(s) 1206-1 to address such situations. Such words could likewise be assigned various weights according to their significance. The common keyword schema(s) 1206-1 could be used preliminarily or otherwise with respect to other keyword schema(s) 1206, such as more specific schema(s) 1206.

Certain embodiments may adapt over time to modify inclusions in word buckets 1212. Certain embodiments could apply a heuristic approach to adaptation. Adaptation could be based on which words are more frequently used words for buyers of a particular service. Similar calls could be analyzed together to find statistical characteristics of keywords used. The keywords could be ranked to assign greater weight to the more frequently used words. Such analyses could be performed on service provider basis, a service category basis, a location basis, and/or the like.

Certain embodiments may provide a service provider with feedback options 1220 regarding callers and lead potential. User-selectable options (via pop-up, the advertiser platform/dashboard discussed herein, and/or the like) could be provided to allow a service provider to rate a caller to indicate lead potential, designate the call as a lead, non-lead, wrong number, etc., and/or to otherwise provide feedback information about a call that the service provider received. Accordingly, the system could confirm which calls actually lead to a sale, are otherwise good leads, are bad leads or non-leads, etc. The feedback 1220 could be used for training the system to heuristically adapt word sets. In view of the feedback 1220 regarding specific calls, the call recordings 1106, transcriptions 1108, and/or call impressions 1112 could be analyzed to identify keywords therein. For example, if a call was identified as a good lead and the call contained a particular set of keywords, and the service provider confirmed that call was a good lead, then a subsequent having a similar set of keywords could be analogized to the earlier call to conclude that the subsequent call is likely a good lead. This could be particularly beneficial in businesses that are relatively unique or that have callers difficult to differentiate from a lead perspective.

In some embodiments, a personalized profile of a service provider may be associated with one or more keyword schemas 1206. The particular service provider could have an individually customized keyword schema 1206. Customizations could involve screening out calls with keywords that are distinctive to a particular service provider. For example, personal calls of the service provider, say with the service provider's spouse, could be excluded. Keywords indicative of personal calls, say terms of endearment, could be identified, and the associated caller phone number could be retained on an exclusion list so that any calls from that particular number are automatically and preemptively screened out as non-leads and not subject to lead processing.

The evidence of calls be of personal nature may include repetition of calls and/or times of day that the calls are made. This could be considered as corroborating evidence, as in some cases what might be considered a term of endearment in one context, say "Honey," might be a common manner of speaking in another context, such as where, in some regions, "Honey" and "Hun" are used by some individuals even when directed at strangers.

Over time, both positive words and negative words could be accumulated, identified, and used to process calls more effectively. In addition, there may be identified words that could simply be ignored as not being indicative of anything. Words of little or no significance to the lead qualification process could be screened out.

Certain embodiments may provide for accent recognition. Accent recognition may allow for more accurate lead qualification. Not only would the data capture be more accurate, but also the recognition of a particular accent could be used in the qualification process to adjust the lead score. For example, the recognition of a particular accent may allow for demographic characterization of a caller.

In some embodiments, a client application 251 installed on the mobile communication device 121 of the service provider can be configured to manage multiple phone numbers. Some service providers may give out one phone to customers and one to personal contacts. There may be a virtual number and a regular phone number. Thus, calls to multiple phone numbers could ring the communication device 121. The application 251 could differentiate between calls coming in to each of multiple phone numbers to disregard personal calls but process business calls. In some embodiments where the backend system 116 routes the call to the mobile communication device 121, the system may notify the application 251 on the mobile communication device 121 that the call should be processed as a non-personal call. The backend system 106 could notify the application that a call is a personal call.

Figure 13:
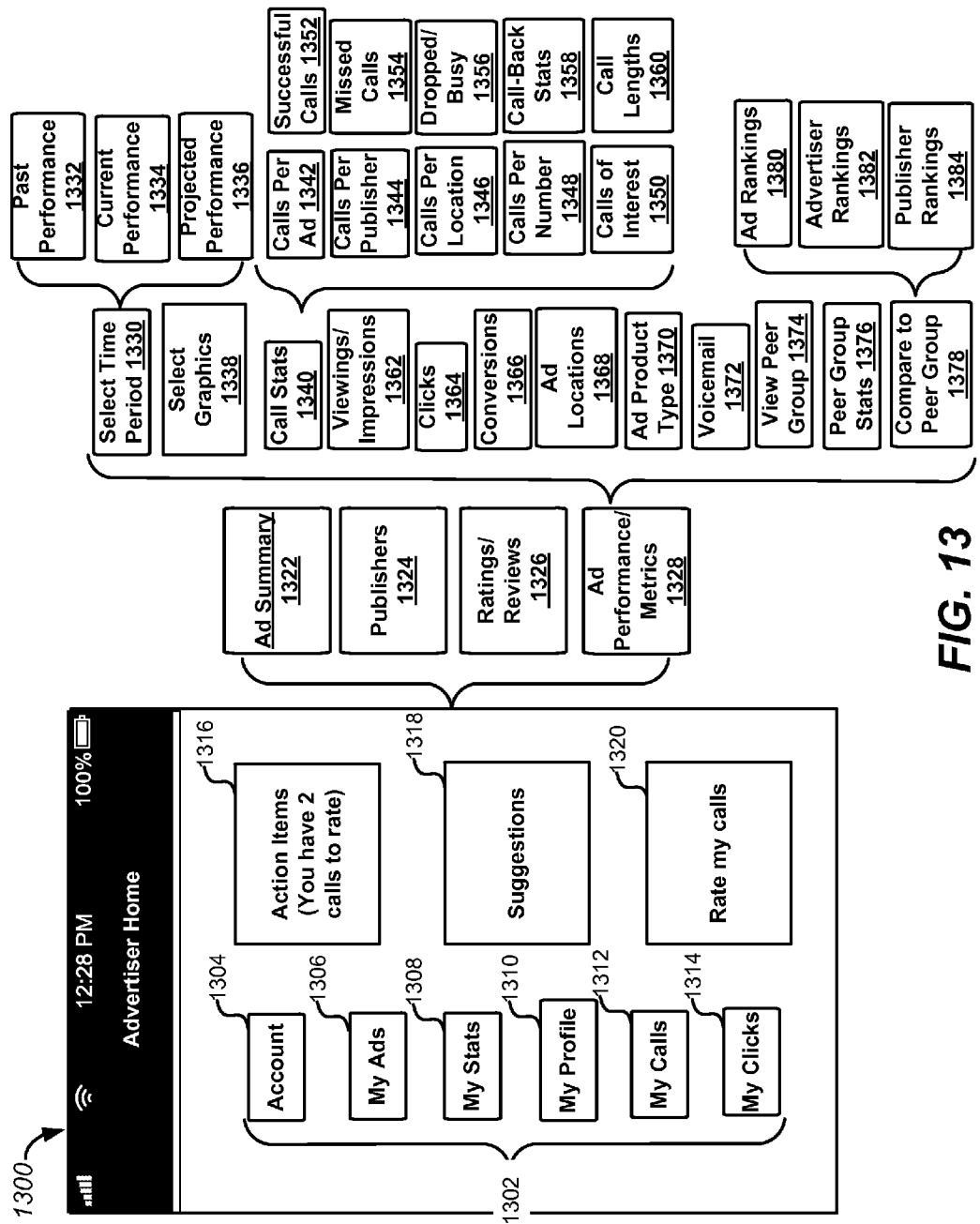
FIG. 13 depicts an advertiser interface for an advertising platform, in accordance with certain embodiments of the present disclosure.

FIG. 13 illustrates one embodiment of an advertiser interface for an advertising platform, in accordance with certain embodiments of the present disclosure. In some embodiments, tracking information gathered as discussed herein may be presented via the advertiser interface and/or be one or more bases for information presented via the advertiser interface. Accordingly, in some embodiments, tracking information gathered via back channel notification may be used for presentation of information of interest via an advertiser interface.

In certain aspects, the advertiser interface for the advertising platform may include a dashboard 1300. After an advertiser logs in, different data points that can be of use for the advertiser may be presented to the advertiser. The dashboard 1300 may include any software process or module operable to present and receive information to/from an advertiser 110, allow an advertiser monitor advertising information, select different types of advertising data, identify desired metrics, automatically generate dashboard views, customize dashboard views, and/or the like. The example of the dashboard 1300 is not limiting, but may be illustrative of a mobile application interface.

In some embodiments, the dashboard 1300 may correspond to an advertiser home page that an advertiser might see upon initialization of the app or logging on to the platform. The dashboard 1300 may provide a graphical user interface (GUI) that includes any number and type of user-selectable options 1302 to facilitate various embodiments. In various embodiments, one or more user-selectable options 1302 may include one or more of a screen-labeled function key, an icon, a button, a soft button, a window, a menu, a control widget, a scroll bar, a slider, a listbox, and/or the like. In various embodiments, one or more user-selectable options may be selectable via one or more of touch, push, movement-based selection, and/or any suitable navigation feature.

In various embodiments, to facilitate various aspects, the user-selectable options 1302 may include one or more of an account feature 1304, an advertisements management feature 1306, an advertisement statistics feature 1308, a profile management feature 1310, a call management feature 1312, a click management feature 1314, an action item feature 1316, a suggestions/recommendations feature 1318, and/or a rate my calls feature 1320. In various embodiments, any one of the feature may include automatically presented information on the advertiser home page.

An advertisement summary feature 1322 may be configured to present a list or otherwise present a compilation of an advertiser's advertisements with access to further details. In some embodiments, potential/suggested advertisements/advertisement products may also be presented. The potential/suggested advertisements/advertisement products may be identified/selected based on comparison with an advertiser's current advertiser profile with other profiles, which may include an ideal profile tailored to a specific vertical and/or service category or which may be at least partially based on other profiles of other advertisers.

A publishers summary feature 1324 may be configured to present access to details regarding publishers. The publishers could correspond to those publishers that have presented advertisements of a particular advertiser. The publishers could also correspond to potential/suggested publishers. The potential/suggested publishers may be identified/selected based on comparison with an advertiser's current advertiser profile with other profiles, which may include an ideal profile tailored to a specific vertical and/or service category or which may be at least partially based on other profiles of other advertisers.

A ratings/reviews feature 1326 may be configured to present access to details regarding ratings and/or reviews associated with an advertiser's advertisements, products, services, businesses, publishers, etc. The ratings and/or reviews may correspond to consumer feedback per surveys and/or any suitable feedback gathering tool. In some embodiments, ratings and/or reviews may correspond to industry assessments, peer assessments, and/or assessments provided by the advertising platform that could be based on comparison with an advertiser's current advertiser profile with other profiles, which may include an ideal profile tailored to a specific vertical and/or service category or which may be at least partially based on other profiles of other advertisers.

An advertisement performance metrics feature 1328 may be configured to present access to details regarding any suitable advertisement performance metrics, such as any one or combination of the various advertisement performance metrics described herein. A time period selection feature 1330 may be configured to allow for selection of a time period for which to view certain performance metrics. Past performance, current performance, and projected options 1332, 1334, 1336 may be provided. Past performance could show performance metrics for past week, month, billing period, three months, six months, year, etc. Current performance could show real-time performance in the context of recent activity such as the last hour, day, week, etc. Projected performance could show extrapolation of past and/or current performance data into future, such as any coming time period. Projected performance could be based on any suitable factor, including aggregate performance of other advertisers in the market, publisher performance, market data for a particular location, and/or the like.

A graphic selection feature 1338 may be configured to present access to details of advertisement performance metrics and/or any suitable data according various embodiments herein in any suitable format with any suitable graphics. By way of example without limitation, pie charts, bar graphs, line graphs, tables, with features allowing ordering and/or filtering of data according to any suitable criteria, matrices, Venn diagrams, images, photos, and/or the like may be implemented according to various embodiments. In some embodiments, the graphic selection feature 1338 may allow for advertiser customization and/or manipulations of graphics presented with the dashboard 1300.

As part of the advertisement performance metrics, a call statistics feature 1340 may be configured to present access to details regarding any call in response to the advertiser's advertisements. Options for presenting access to details about call per particular advertisements 1342, calls per particular publishers 1344, calls per particular location 1346, calls using a particular number 1348, calls of interest 1350 which may be based on any suitable additional information, such as intelligence a particular caller of interest, a particular location of interest, etc., successful calls 1352 that were successfully connected, missed calls 1354, dropped calls/calls receiving a busy tone 1356, call-back statistics 1358, call lengths 1360, and/or the like. For instance, the call of interest feature 1350 could identify a number of calls from a particular call in a particular time period as an indication of interest. A caller who has made five calls to a particular advertiser or to advertisers in a particular service category in the last ten minutes may be taken as an indication of high interest. As another example, the call-back statistics features 1358 could indicate an advertiser's average time to call a consumer back. When a consumer clicks on an advertisement, information may be known such that time may be tracked between the advertising information handling system 106 sending an alert to the corresponding advertiser and the subsequent opening of the application on the advertiser's end. The advertisement performance metrics feature 1328 may be configured to present access to details regarding any advertisement viewings/impressions 1362, advertisement clicks 1364, advertisement conversions 1366, advertisement locations 1368, advertisement product types 1370, voicemail left by callers 1372, and/or the like.

A peer group feature 1374 may be configured to present access to details regarding peer group of advertisers. A peer group of advertisers could be identified and/or defined by advertising category and/or geography. A peer group statistics feature 1376 may be configured to present access to details any suitable performance data regarding a peer group. The data could be anonymized in some embodiment to only show aggregated information; in other embodiments the data may not be anonymized, but may tie particular data to particular advertisers in the peer group. For example, the data could be specifically tie to particular advertisers of a sales force within a company. A peer group comparison feature 1378 may be configured to present access to details regarding comparisons of a particular advertiser's performance to performance of a peer group of advertisers. Any type of performance data may be compared. By way of example without limitation, the peer group comparison feature 1378 may allow for advertisement rankings 1380, advertiser rankings 1382, and/or publisher ranking 1384 with respect to the peer group. For instance, average and top performers could be identified, a top ten performer could be identified, etc. A comparison to a peer group may indicate, for example, that plumbers on average are getting ten calls/day, and that a particular advertiser is only getting five calls per day. As another example, a comparison to a peer group may indicate advertisement products and/or packages that advertisers in the peer group have, generally or specifically. For instance, a comparison may reveal that most plumbers have a bronze package that generates an average of ten calls per week, but those that have a silver package generate an average of 20 calls per week.

The rate my calls feature 1320 could be provided to allow a service provider to rate a caller to indicate one or more of lead potential, designate the call as a lead, non-lead, wrong number, etc., and/or to otherwise provide feedback information about a call that the service provider received. Accordingly, the system could confirm which calls actually lead to a sale, are otherwise good leads, are bad leads or non-leads, etc. In some embodiments, the rate my calls feature 1320 could be a pop-up that is presented for certain calls. For example, certain calls may be more questionable than others as to lead potential. The most questionable calls could be selected by the system for presentation to the service provider. In some embodiments, the option to rate one or more calls could be listed as an action item(s) 1316. In some embodiments, the option to rate one or more calls could be identified alongside certain call listings presented upon selection of the my calls option 1312.

It is to be understood that the depicted dashboard 1300 is for example purposes only. Accordingly, the dashboard 1300 may provide a GUI that may include or present data for an advertiser interface of an advertising platform in any suitable format with any suitable layout of any suitable sets/subsets of features, along with any desired graphical depiction of information, to facilitate features of various embodiments of the present disclosure.

As previously discussed, the advertising information handling system 106 may include one or more logging engines 146(*f*). The logging engines 146(*f*) may be configured to perform logging processes to receive and log data of interest for advertisements and/or listings. In some embodiments, one or more performance analytics modules may include logic to retrieve, process, derive, compile, aggregate, handle, store, report, and/or present information relating to performance data associated with advertiser accounts. The performance analytics module may be configured to present any desirable information in any desirable manner. With respect to a particular advertiser, the logging and performance analytics may facilitate various features of an advertiser interface for an advertising platform, in accordance with certain embodiments herein. For example, the logging and performance analytics may facilitate one or more of the advertisements management feature 1306, the advertisement statistics feature 1308, the call management feature 1312, the click management feature 1314, etc.

As used herein, "advertisement" may encompass "listing" in certain embodiments. The advertisements could be those sent to publishers and/or end users. The data may be performance data that is indicative of advertisement performance, may be data indicative of performance data, and/or may be data from which performance data is derivable. In various embodiments, data that can be used to track performance of an advertisement may be received directly by the advertising information handling system 106 or via a publisher. In some embodiments, advertisements sent to publishers may be tagged in any suitable manner that allows tracking of any desirable aspects of advertisement performance.

In some embodiments, performance data and/or data that can be used to derive performance data may be stored in a performance data repository. The data may be consolidated in any suitable manner. For example, the data could be consolidated on an advertiser basis, a publisher basis, a service category basis, an advertising product/pricing model basis, and/or the like.

Data of interest could indicate a manner in which a user interacted with an advertisement. Data of interest could include call data. For example, data could be indicative of calls responsive to advertisements and/or listings. Data could be indicative of call-backs from a publisher's server. Data could be indicative of a number of calls that are responsive to a particular advertisement from end users in a certain time period. For pay-per-call ads, calls may be logged in to a call center, such as one implemented with the call handling module. Using tracking numbers, the phone number that was dialed by a user could be mapped to advertisers, advertisements, and/or publishers. In various embodiments, phone numbers and/or extensions, which may or may not include aliases, may be assigned to advertisers as unique to advertisements, as shared by certain advertisements, as unique to an advertiser, as shared by certain advertisers, as unique to a publisher, as shared by certain publisher, and/or on any suitable basis. For example, in some embodiments, a publisher may be assigned a single number for a set of advertisers. In some embodiments, an extension may be assigned to the publisher for each of the advertisers. In some embodiments, an advertiser may receive a single/base telephone number for a set of publishers. In some embodiments, an extension may be assigned to the advertiser for each of the publishers.

In some embodiments, the logging engines 146(*f*) may include tracking logic to track calls, in accordance with certain embodiments. In some embodiments, the logging engines 146(*f*) may be configured to identify whether a caller is successfully connected with an advertiser, whether the call is missed, whether the call is dropped/disconnected/receives a busy tone, whether the call is routed to voicemail, and/or whether a voicemail is left. In some embodiments, the logging engines 146(*f*) may include ANI logic to identify numbers of callers. In some embodiments, the logging engines 146(*f*) may be configured to track the length of calls. In some embodiments, the logging engines 146(*f*) may be configured to record calls.

Data of interest could include click data. For example, data could be indicative of clicks to advertisements. For example, data could be indicative of a number of clicks, whether by logging the direct request of the clicks or a concomitant tracker, that a particular advertisement received from end users via computing device in a certain time period.

Data of interest could include other types of data. For example, data could include one or more of advertisement viewings/impressions; advertisement conversions; third party data; publisher data, which publishers have presented which advertisements and associated details, such as numbers of showing on publisher sites over a certain time period, how many views per time period, which could be on a per publisher site basis; review data, such as reviews associated with an advertisement, ratings, how many times a review is read; feedback data that may indicate user preferences, such as user preferences regarding certain advertisements; more details around call/click data, caller name information from calling name delivery (CNAM), also known as caller identification or caller ID; location information, such as information about the area of a caller, demographic data about the area, history for a particular area; history for particular callers, and/or the like.

In some embodiments, the performance analytics module may be configured to present comparative data. For example, current performance data may be compared to past performance data. A particular advertiser may compare that particular advertiser's performance to performance of a peer group of advertisers. A peer group of advertisers could be identified and/or defined by advertising category and/or geography. Any type of performance data may be compared. An advertiser may have user selectable options to select different types of statistics for comparison and order by different types of statistics.

Statistics could be based on time, that is, what has happened in the last hour, day, week, etc. Statistics could be filtered based on distance. For example, statistics could indicate that one or more calls and/or click originated from a distance of X miles with respect to a reference point.

Figure 14:
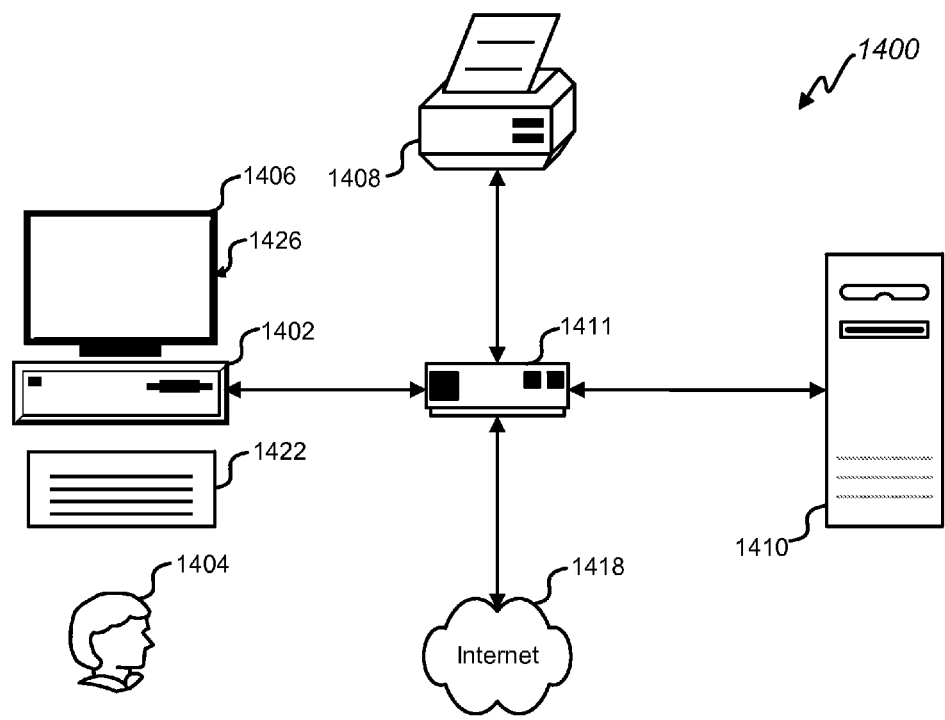
FIG. 14 depicts a block diagram of an embodiment of a computer system, in accordance with certain embodiments of the present disclosure.

Referring next to FIG. 14, an exemplary environment with which embodiments may be implemented is shown with a computer system 1400 that can be used by a designer 1404 to design, for example without limitation, electronic designs. The computer system 1400 can include a computer 1402, keyboard 1422, a network router 1412, a printer 1408, and a monitor 1406. The monitor 1406, processor 1402 and keyboard 1422 are part of a computer system 1426, which can be a laptop computer, desktop computer, handheld computer, mainframe computer, etc. The monitor 1406 can be a CRT, flat screen, etc.

A designer 1404 can input commands into the computer 1402 using various input devices, such as a mouse, keyboard 1422, track ball, touch screen, etc. If the computer system 1400 comprises a mainframe, a designer 1404 can access the computer 1402 using, for example without limitation, a terminal or terminal interface. Additionally, the computer system 1426 may be connected to a printer 1408 and a server 1410 using a network router 1412, which may connect to the Internet 1418 or a WAN.

The server 1410 may, for example without limitation, be used to store additional software programs and data. In some embodiments, software implementing the systems and methods described herein can be stored on a storage medium in the server 1410. Thus, the software can be run from the storage medium in the server 1410. In another embodiment, software implementing the systems and methods described herein can be stored on a storage medium in the computer 1402. Thus, the software can be run from the storage medium in the computer system 1426. Therefore, in this embodiment, the software can be used whether or not computer 1402 is connected to network router 1412. Printer 1408 may be connected directly to computer 1402, in which case, the computer system 1426 can print whether or not it is connected to network router 1412.

Figure 15:
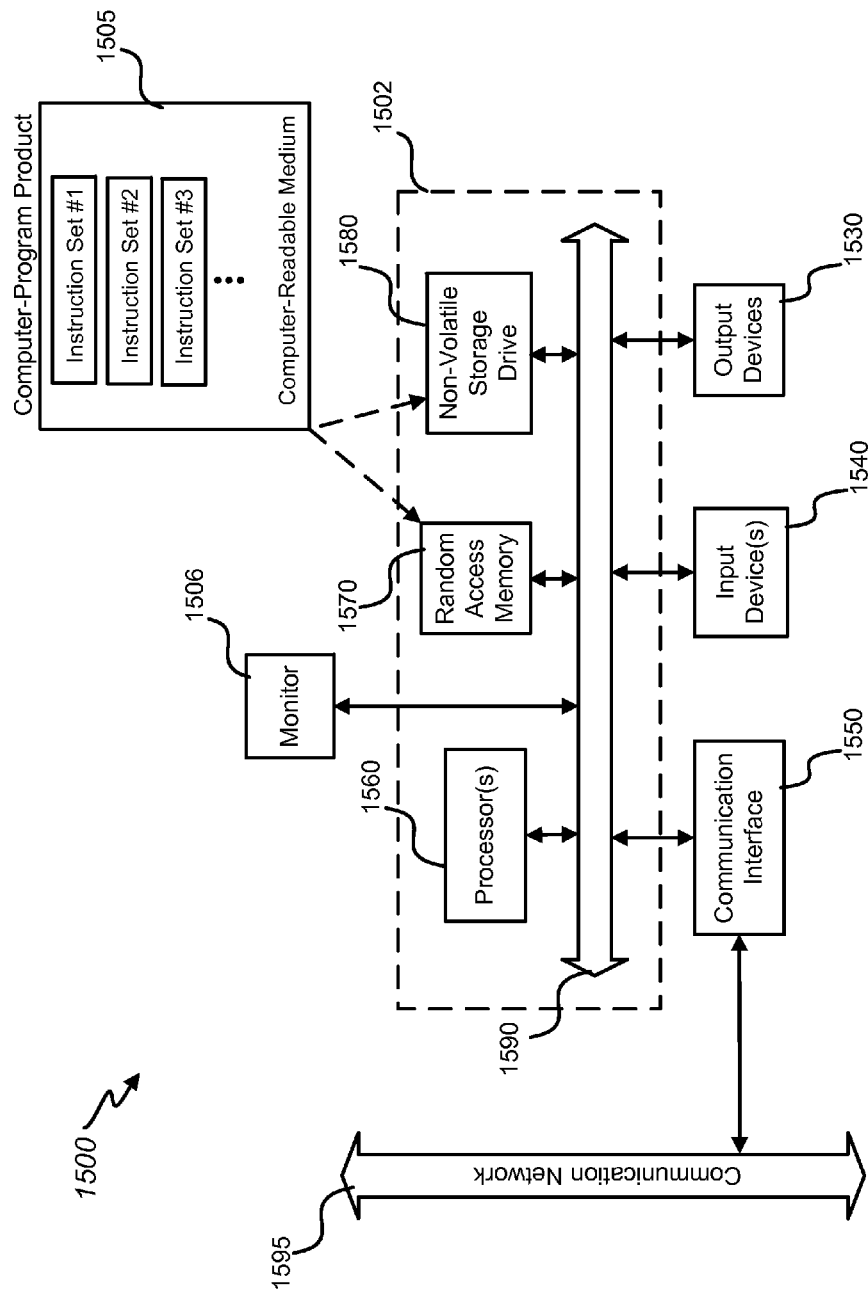
FIG. 15 depicts a block diagram of an embodiment of a special-purpose computer system, in accordance with certain embodiments of the present disclosure.

With reference to FIG. 15, an embodiment of a special-purpose computer system 1500 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1526, it is transformed into the special-purpose computer system 1500.

Special-purpose computer system 1500 comprises a computer 1502, a monitor 1506 coupled to computer 1502, one or more additional user output devices 1530 (optional) coupled to computer 1502, one or more user input devices 1540 (e.g., keyboard, mouse, track ball, touch screen) coupled to computer 1502, an optional communications interface 1550 coupled to computer 1502, a computer-program product 1505 stored in a tangible computer-readable memory in computer 1502. Computer-program product 1505 directs system 1500 to perform the above-described methods. Computer 1502 may include one or more processors 1560 that communicate with a number of peripheral devices via a bus subsystem 1590. These peripheral devices may include user output device(s) 1530, user input device(s) 1540, communications interface 1550, and a storage subsystem, such as random access memory (RAM) 1570 and non-volatile storage drive 1580 (e.g., disk drive, optical drive, solid state drive), which are forms of tangible computer-readable memory.

Computer-program product 1505 may be stored in non-volatile storage drive 1580 or another computer-readable medium accessible to computer 1502 and loaded into memory 1570. Each processor 1560 may comprise a microprocessor, such as a microprocessor from Intel® or Advanced Micro Devices, Inc.®, or the like. To support computer-program product 1505, the computer 1502 runs an operating system that handles the communications of product 1505 with the above-noted components, as well as the communications between the above-noted components in support of the computer-program product 1505. Exemplary operating systems include Windows® or the like from Microsoft® Corporation, Solaris® from Oracle °, LINUX, UNIX, and the like.

User input devices 1540 include all possible types of devices and mechanisms to input information to computer system 1502. These may include a keyboard, a keypad, a mouse, a scanner, a digital drawing pad, a touch screen incorporated into the display, audio input devices such as voice recognition systems, microphones, and other types of input devices. In various embodiments, user input devices 1540 are typically embodied as a computer mouse, a trackball, a track pad, a joystick, wireless remote, a drawing tablet, a voice command system. User input devices 1540 typically allow a user to select objects, icons, text and the like that appear on the monitor 1506 via a command such as a click of a button or the like. User output devices 1530 include all possible types of devices and mechanisms to output information from computer 1502. These may include a display (e.g., monitor 1506), printers, non-visual displays such as audio output devices, etc.

Communications interface 1550 provides an interface to other communication networks 1595 and devices and may serve as an interface to receive data from and transmit data to other systems, WANs and/or the Internet 1518. Embodiments of communications interface 1550 typically include an Ethernet card, a modem (telephone, satellite, cable, ISDN), a (asynchronous) digital subscriber line (DSL) unit, a FireWire® interface, a USB® interface, a wireless network adapter, and the like. For example without limitation, communications interface 1550 may be coupled to a computer network, to a FireWire® bus, or the like. In other embodiments, communications interface 1550 may be physically integrated on the motherboard of computer 1502, and/or may be a software program, or the like.

RAM 1570 and non-volatile storage drive 1580 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1570 and non-volatile storage drive 1580 may be configured to store the basic programming and data constructs that provide the functionality of various embodiments of the present invention, as described above.

Software instruction sets that provide the functionality of the present invention may be stored in RAM 1570 and non-volatile storage drive 1580. These instruction sets or code may be executed by the processor(s) 1560. RAM 1570 and non-volatile storage drive 1580 may also provide a repository to store data and data structures used in accordance with the present invention. RAM 1570 and non-volatile storage drive 1580 may include a number of memories including a main random access memory (RAM) to store of instructions and data during program execution and a read-only memory (ROM) in which fixed instructions are stored. RAM 1570 and non-volatile storage drive 1580 may include a file storage subsystem providing persistent (non-volatile) storage of program and/or data files. RAM 1570 and non-volatile storage drive 1580 may also include removable storage systems, such as removable flash memory.

Bus subsystem 1590 provides a mechanism to allow the various components and subsystems of computer 1502 communicate with each other as intended. Although bus subsystem 1590 is shown schematically as a single bus, alternative embodiments of the bus subsystem may utilize multiple busses or communication paths within the computer 1502.

Specific details are given in the above description to provide a thorough understanding of the embodiments. However, it is understood that the embodiments may be practiced without these specific details. For example without limitation, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example without limitation, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example without limitation, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method to track call information pertinent to one or more calls responsive to one or more advertisements presented to a user of a communication device where a call information handling system utilizes communications via a data network to facilitate the tracking of call information, the method comprising:
receiving, by a call information handling system, a message via a data network from a communication device running an application, the communication device configured with the application to:
associate the application with a communication reference of the communication device;
detect a selection of a user-selectable option presented via the communication device;
responsive to the selection of the user-selectable option, send the message, via the data network, to the call information handling system, wherein the selection corresponds to an advertisement presented via the communication device, and wherein the message indicates call information corresponding to:
the communication reference;
the advertisement;
the communication device; and
a callee communication reference;
processing, by the call information handling system, the message and identifying the call information;
determining, by the call information handling system, unique identification of the communication device or a user of the communication device based at least in part on the message indicating call information received from the communication device, wherein the user is different from an advertiser corresponding to the advertisement; and
storing, by the call information handling system, the call information in a tracking information repository in association with the unique identification.

2. The method of claim 1, further comprising:
identifying the advertiser corresponding to the advertisement; and causing indication, via an advertiser interface of the call information handling system, of one or more items of the call information.

3. The method of claim 1, wherein the communication reference of the communication device comprises a telephone number or a subscriber identification.

4. The method of claim 1, wherein the communication device configured with the application is further configured to present the advertisement via the application.

5. The method of claim 1, wherein the communication device configured with the application is further configured to capture information about the advertisement, wherein the advertisement is presented via another application of the communication device.

6. The method of claim 1, wherein the user-selectable option comprises a click-to-call option corresponding to the advertisement.

7. The method of claim 1, wherein the user-selectable option comprises a call button, wherein the communication device configured with the application is further configured to determine an association of the selection of the user-selectable option with the advertisement.

8. The method of claim 1, further comprising:
initiating a communication session, via the data network, with a callee communication device based at least in part on the callee communication reference.

9. The method of claim 8, further comprising:
coordinating the communication session to facilitate voice communication between the callee communication device and the communication device via the data network.

10. The method of claim 1, wherein the message does not comprise the callee communication reference, and the call information handling system determines the callee communication reference based at least in part on the call information.

11. The method of claim 1, wherein the selection further corresponds to an initiation of a first communication session from the communication device, and the method further comprises:
initiating a second communication session, via the data network, with a callee communication device based at least in part on the callee communication reference; and
coordinating the first communication session and the second communication session to facilitate voice communication between the callee communication device and the communication device via the data network.

12. The method of claim 11, wherein the callee communication device and the communication device are not mutually connected until the callee communication device is answered.

13. The method of claim 1, further comprising:
initiating a communication session, via the data network, with a callee communication device;
initiating a communication session, via the data network, with the communication device; and
facilitating voice communication, via the data network, between the callee communication device and the communication device.

14. The method of claim 1, further comprising:
initiating a plurality of communication sessions, via the data network, with a plurality of callee communication devices based at least in part on the callee communication reference; and
coordinating the plurality of communication sessions to facilitate voice communication, via the data network, between a selected one of the plurality of callee communication devices and the communication device.

15. The method of claim 1, further comprising:
determining one or more characteristics of a data connection available to the communication device;
determining whether the one or more characteristics of the data connection satisfy a set of criteria;
contingent on determining that the one or more characteristics of the data connection satisfy the set of criteria, initiating the communication session over the data network with a callee communication device based at least in part on the callee communication reference; and
contingent on determining that the one or more characteristics of the data connection do not satisfy the set of criteria, allowing a call from the communication device to proceed with a telephony network.

16. A system to track call information pertinent to one or more calls responsive to one or more advertisements presented to a user of a communication device utilizing communications via a data network to facilitate the tracking of call information, comprising:
one or more network interfaces configured to receive communications via a data network from a communication device running an application, the communication device configured with the application to:
associate the application with a communication reference of the communication device;
detect a selection of a user-selectable option presented via the communication device;
responsive to the selection of the user-selectable option, send the message, via the data network, to the call information handling system, wherein the selection corresponds to an advertisement presented via the communication device, and wherein the message indicates call information corresponding to:
the communication reference;
the advertisement;
the communication device; and
a callee communication reference;
a tracking information repository to retain information relating to calls;
one or more processing devices coupled to the one or more network interfaces and the tracking information repository, the one or more processing devices configured to:
process the message and identifying the call information;
determine unique identification of the communication device or a user of the communication device based at least in part on the message indicating call information received from the communication device, wherein the user is different from an advertiser corresponding to the advertisement; and
store the call information in the tracking information repository in association with the unique identification.

17. The system of claim 16, wherein the one or more processing devices comprise one or more switches and are further configured to initiate a communication session, via the data network, with a callee communication device based at least in part on the callee communication reference.

18. The system of claim 16, wherein the one or more processing devices comprise one or more switches and are further configured to:
initiate a communication session, via the data network, with a callee communication device;
initiate a communication session, via the data network, with the communication device; and
facilitate voice communication, via the data network, between the callee communication device and the communication device.

19. One or more non-transitory, machine-readable media having machine-readable instructions thereon which, when executed by one or more computers or other processing devices, cause the one or more computers or other processing devices to:
receive a message via a data network from a communication device running an application, the communication device configured with the application to:
associate the application with a communication reference of the communication device;
detect a selection of a user-selectable option presented via the communication device;
responsive to the selection of the user-selectable option, send the message, via the data network, to the one or more computers or other processing devices, wherein the selection corresponds to an advertisement presented via the communication device, and wherein the message indicates call information corresponding to:
the communication reference;
the advertisement;
the communication device; and
a callee communication reference;
process the message and identifying the call information;
determine unique identification of the communication device or a user of the communication device based at least in part on the message indicating call information received from the communication device, wherein the user is different from an advertiser corresponding to the advertisement; and
store the call information in a tracking information repository in association with the unique identification.

20. The one or more non-transitory, machine-readable media of claim 19, wherein the instructions further cause the one or more computers or other processing devices to:
initiate a communication session, via the data network, with a callee communication device based at least in part on the callee communication reference.

* * * * *